United States Patent
Togawa et al.

(10) Patent No.: US 12,449,107 B2
(45) Date of Patent: Oct. 21, 2025

(54) LIGHT-TRANSMITTING RESIN MEMBER

(71) Applicant: Stanley Electric Co., Ltd., Tokyo (JP)

(72) Inventors: Hiroyuki Togawa, Tokyo (JP); Hideo Takagi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/719,552

(22) PCT Filed: Dec. 6, 2022

(86) PCT No.: PCT/JP2022/044998
§ 371 (c)(1),
(2) Date: Jun. 13, 2024

(87) PCT Pub. No.: WO2023/112783
PCT Pub. Date: Jun. 22, 2023

(65) Prior Publication Data
US 2025/0137610 A1  May 1, 2025

(30) Foreign Application Priority Data
Dec. 15, 2021 (JP) .................................. 2021-203596

(51) Int. Cl.
*F21S 43/20* (2018.01)
*F21S 41/275* (2018.01)
(Continued)

(52) U.S. Cl.
CPC ......... *F21S 43/2817* (2024.05); *F21S 41/275* (2018.01); *F21S 43/26271* (2024.05); *G02B 1/18* (2015.01); *F21Y 2115/10* (2016.08)

(58) Field of Classification Search
CPC ........ F21S 43/2817; F21S 41/275; G02B 1/18
See application file for complete search history.

(56) References Cited

U.S. PATENT DOCUMENTS

| | | | | |
|---|---|---|---|---|
| 5,130,898 A | * | 7/1992 | Akahane | G02B 6/0036 362/236 |
| 2012/0057100 A1 | * | 3/2012 | Masuda | G02B 5/045 359/619 |

(Continued)

FOREIGN PATENT DOCUMENTS

| | | | | |
|---|---|---|---|---|
| JP | 2015-189207 A | | 11/2015 | |
| JP | 2020145036 A | * | 9/2020 | ............ F21S 41/135 |
| JP | 2020-181109 A | | 11/2020 | |

OTHER PUBLICATIONS

International Search Report for PCT/JP2022/044998 dated Jan. 24, 2023.

*Primary Examiner* — Christopher E Dunay
(74) *Attorney, Agent, or Firm* — KENEALY VAIDYA LLP

(57) ABSTRACT

A light-transmitting resin member is provided that can inhibit color appearance in which the light-transmitting resin member appears to be colored depending on a viewpoint position. Provided is a light-transmitting resin member, in at least a part of a surface of which a plurality of groove structures configured with a plurality of linear protrusion portions and a plurality of linear recess portions are formed and in which the linear protrusion portions and the linear recess portions extend in directions parallel with each other and the grooves are formed at a pitch at which transmittance of visible light incident at an incident angle in a predetermined range becomes approximately constant, the visible light being incident on a region, in which the grooves are formed, in the surface, the visible light being transmitted through the light-transmitting resin member.

15 Claims, 28 Drawing Sheets

(51) Int. Cl.
*G02B 1/18* (2015.01)
*F21Y 115/10* (2016.01)

(56) References Cited

U.S. PATENT DOCUMENTS

| | | | | |
|---|---|---|---|---|
| 2013/0129981 | A1* | 5/2013 | Hiromitsu | G02B 5/223 |
| | | | | 264/1.36 |
| 2020/0096167 | A1* | 3/2020 | Asaoka | G02B 5/0231 |
| 2023/0160219 | A1* | 5/2023 | Murata | E04F 13/16 |
| | | | | 52/177 |
| 2023/0228915 | A1* | 7/2023 | Muramoto | G02B 1/111 |
| | | | | 359/507 |

* cited by examiner

|  | GROOVE ANGLE 90° | GROOVE ANGLE 78° | GROOVE ANGLE 60° |
|---|---|---|---|
| ASPECT RATIO 1.0 | SAMPLE 1<br><br>NO ANTI-FOGGING EFFECT | ANTI-FOGGING EFFECT UNKNOWN | SAMPLE 2<br><br>NO ANTI-FOGGING EFFECT |
| ASPECT RATIO 1.3 | SAMPLE 3<br><br>NO ANTI-FOGGING EFFECT | ANTI-FOGGING EFFECT UNKNOWN | ANTI-FOGGING EFFECT UNKNOWN |
| ASPECT RATIO 1.7 | ANTI-FOGGING EFFECT UNKNOWN | ANTI-FOGGING EFFECT UNKNOWN | ANTI-FOGGING EFFECT UNKNOWN |
| ASPECT RATIO 2.0 | SAMPLE 4<br><br>ANTI-FOGGING EFFECT PRESENT | SAMPLE 5<br><br>ANTI-FOGGING EFFECT PRESENT | — |
| ASPECT RATIO 2.7 | SAMPLE 6<br><br>ANTI-FOGGING EFFECT PRESENT | ANTI-FOGGING EFFECT UNKNOWN | — |

Fig. 5

| SAMPLE | STUDIED ITEMS | GROOVE WIDTH AND GROOVE DEPTH | EFFECT |
|---|---|---|---|
| SAMPLE 1 | GROOVE ANGLE 90° ASPECT RATIO 1.0 | GROOVE WIDTH 150mm GROOVE DEPTH 150mm | POOR |
| SAMPLE 2 | GROOVE ANGLE 60° ASPECT RATIO 1.0 | GROOVE WIDTH 150mm GROOVE DEPTH d 150mm | POOR |
| SAMPLE 3 | GROOVE ANGLE 90° ASPECT RATIO 1.3 | GROOVE WIDTH 150mm GROOVE DEPTH d 200mm | POOR |
| SAMPLE 4 | GROOVE ANGLE 90° ASPECT RATIO 2.0 | GROOVE WIDTH 150mm GROOVE DEPTH 300mm | EXCELLENT |
| SAMPLE 5 | GROOVE ANGLE 78° ASPECT RATIO 2.0 | GROOVE WIDTH 150mm GROOVE DEPTH 300mm | EXCELLENT |
| SAMPLE 6 | GROOVE ANGLE 90° ASPECT RATIO 2.7 | GROOVE WIDTH 75mm GROOVE DEPTH 200mm | EXCELLENT |

Fig. 6

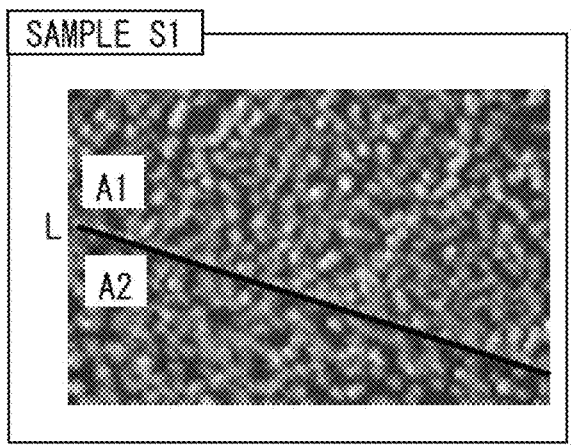
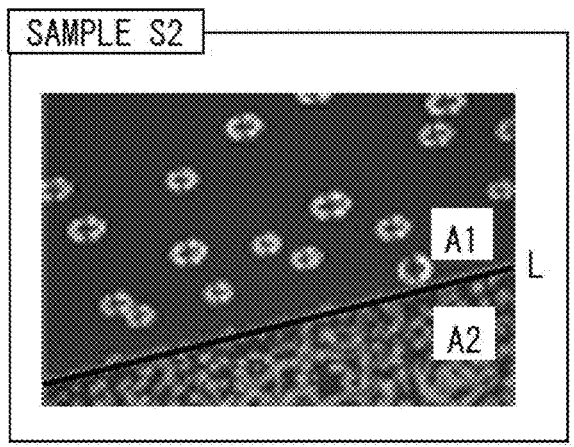
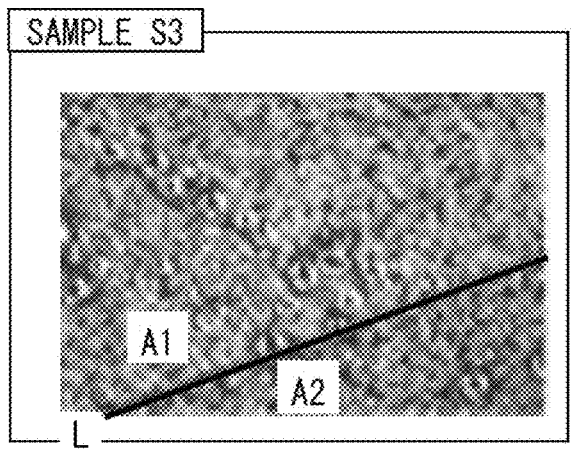
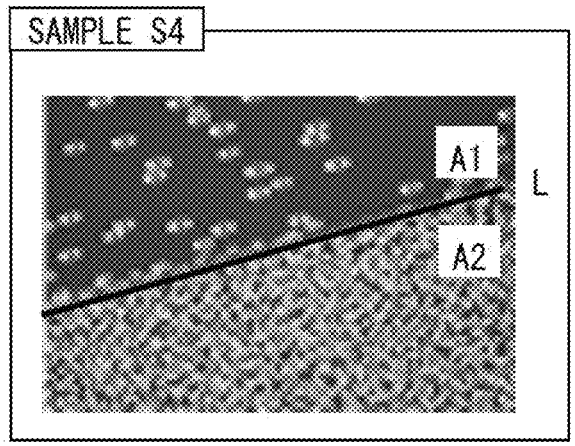
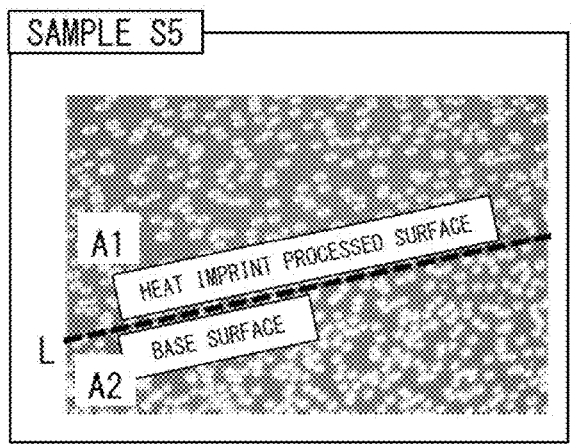
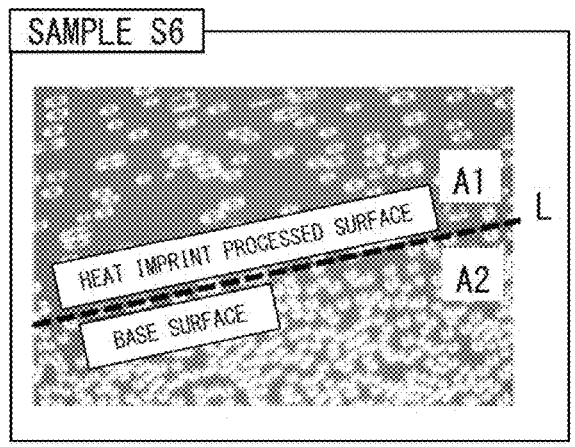
Fig. 7

| | GROOVE STRUCTURE | ANTI-FOGGING EFFECT | LIQUID DROPLET AREA (PROCESSED SURFACE) | LIQUID DROPLET AREA (BASE SURFACE) | LIQUID DROPLET ABUNDANCE RATIO | EVALUATION |
|---|---|---|---|---|---|---|
| SAMPLE 1 | ASPECT RATIO 1.0 INCLINATION ANGLE 90° SURFACE AREA INCREASE RATE 2.0 | NO EFFECT | 36.7% | 40.5% | 90.6% | POOR |
| SAMPLE 2 | ASPECT RATIO 1.0 INCLINATION ANGLE 60° SURFACE AREA INCREASE RATE 1.9 | NO EFFECT | 46.7% | 41.5% | 113% | POOR |
| SAMPLE 3 | ASPECT RATIO 1.3 INCLINATION ANGLE 90° SURFACE AREA INCREASE RATE 2.3 | NO EFFECT | 26.5% | 28.8% | 92.0% | POOR |
| SAMPLE 4 | ASPECT RATIO 2.0 INCLINATION ANGLE 90° SURFACE AREA INCREASE RATE 3.0 | EFFECT PRESENT | 9.8% | 58.5% | 16.8% | GOOD |
| SAMPLE 5 | ASPECT RATIO 2.0 INCLINATION ANGLE 78° SURFACE AREA INCREASE RATE 2.8 | EFFECT PRESENT | 12.3% | 50.8% | 24.2% | GOOD |
| SAMPLE 6 | ASPECT RATIO 2.7 INCLINATION ANGLE 90° SURFACE AREA INCREASE RATE 3.7 | EFFECT PRESENT | 14.8% | 32.5% | 45.5% | GOOD |

Fig. 8

| No. | GROOVE PITCH | | | AVERAGE TRANSMITTANCE | | |
|---|---|---|---|---|---|---|
| | b1 | b2 | {b(max)-b(min)}/b(ave) | (1)380-480nm | (2)500nm-780nm | (1)/(2) |
| 1 | 250nm | 250nm | 0 | 0.603 | 0.780 | 77.2% |
| 2 | 240nm | 260nm | 0.08 | 0.606 | 0.781 | 77.5% |
| 3 | 230nm | 270nm | 0.16 | 0.616 | 0.779 | 79.1% |
| 4 | 220nm | 280nm | 0.24 | 0.632 | 0.777 | 81.3% |
| 5 | 210nm | 290nm | 0.32 | 0.651 | 0.775 | 84.0% |
| 6 | 200nm | 300nm | 0.4 | 0.671 | 0.771 | 87.0% |
| 7 | 180nm | 320nm | 0.56 | 0.710 | 0.763 | 93.1% |

Fig. 19

| No. | PITCH | | | AVERAGE TRANSMITTANCE | | |
|---|---|---|---|---|---|---|
| | b1 | b2 | {b(max)-b(min)}/b(ave) | (1)380-540nm | (2)560nm-780nm | (1)/(2) |
| 1 | 350nm | 350nm | 0 | 0.771 | 0.925 | 83.3% |
| 2 | 300nm | 400nm | 0.29 | 0.794 | 0.923 | 86.0% |
| 3 | 200nm | 500nm | 0.86 | 0.913 | 0.878 | 104.0% |

Fig. 21

| (b1+b2)/2 | Ra(nm) | ASSUMED MOLD RELEASE RESISTANCE RATIO |
|---|---|---|
| 200 | 200 | 1 |
| 250 | 160 | 0.80 |
| 300 | 133 | 0.67 |
| 350 | 114 | 0.57 |

Fig. 22

| GROOVE PITCH a | SAMPLE S7 a=225nm L/S=150/75 | SAMPLE S8 a=300nm L/S=150/150 | SAMPLE S9 a=450nm L/S=150/300 | SAMPLE S10 a=600nm L/S=150/450 |
|---|---|---|---|---|
| GROOVE SHAPE (REGULAR PITCH) | | | | |
| STEAM TEST RESULT (PHOTO-GRAPH) | ANTI-FOGGING PROPERTIES GOOD | ANTI-FOGGING PROPERTIES GOOD | ANTI-FOGGING PROPERTIES GOOD | ANTI-FOGGING PROPERTIES GOOD |
| WATER DROPLET SHAPE | WATER DROPLETS BECOME LATERALLY LONGER AS PITCH BECOMES NARROWER | | | |
| WATER DROPLET DENSITY | WATER DROPLET DENSITY BECOMES LOWER AS PITCH BECOMES WIDER | | | |

Fig. 23

LIGHT-TRANSMITTING RESIN MEMBER

This application is a U.S. National Stage Application under 35 U.S.C § 371 of International Patent Application No. PCT/JP2022/044998 filed Dec. 6, 2022, which claims the benefit of priority under 35 U.S.C. § 119 to Japanese Patent Application No. 2021-203596 filed Dec. 15, 2021, the disclosures of all of which are hereby incorporated by reference in their entireties.

TECHNICAL FIELD

The present invention relates to a light-transmitting resin member and particularly to a light-transmitting resin member that can inhibit color appearance in which the light-transmitting resin member appears to be colored depending on a viewpoint position.

BACKGROUND ART

Patent Literature 1 discloses a light-transmitting resin member in a surface of which a plurality of groove structures are formed at a uniform pitch, the plurality of groove structures being configured with a plurality of linear protrusion portions and a plurality of linear recess portions.

CITATION LIST

Patent Literature

Patent Literature 1: Japanese Unexamined Patent Application Publication No. 2015-189207

SUMMARY OF INVENTION

Technical Problem

However, the inventors have made a study and found that there is a problem that when a groove pitch of grooves formed in a light-transmitting resin member (for example, an outer lens) is made large, transmittance of visible light transmitted through the light-transmitting resin member is changed, and due to that, color appearance occurs in which the light-transmitting resin member appears to be colored depending on a viewpoint position.

The present invention has been made to solve such a problem, and an object thereof is to provide a light-transmitting resin member that can inhibit color appearance in which the light-transmitting resin member appears to be colored depending on a viewpoint position.

Solution to Problem

A light-transmitting resin member according to the present invention is a light-transmitting resin member, in at least a part of a surface of which a plurality of groove structures configured with a plurality of linear protrusion portions and a plurality of linear recess portions are formed and in which the linear protrusion portions and the linear recess portions extend in directions parallel with each other, and the grooves are formed at a pitch at which transmittance of visible light incident at an incident angle in a predetermined range becomes approximately constant, the visible light being incident on a region, in which the grooves are formed, in the surface, the visible light being transmitted through the light-transmitting resin member.

In such a configuration, color appearance can be inhibited in which the light-transmitting resin member appears to be colored depending on a viewpoint position.

This is because the grooves are formed at the pitch at which the transmittance of the visible light in a predetermined angle range becomes generally constant, the visible light being incident on the region, in which the grooves are formed, in the surface, the visible light being transmitted through the light-transmitting resin member.

In the above light-transmitting resin member, the pitch of the grooves may be an irregular pitch.

In the above light-transmitting resin member, in a case where a maximum pitch of the grooves is set as b(max), a minimum pitch of the grooves is set as b(min), and an average pitch of the grooves is set as b(ave), {b(max)−b(min)}/b(ave)≥0.16 may be satisfied.

In such a configuration, in a case where the pitch of the grooves is the irregular pitch, the color appearance can be inhibited in which the light-transmitting resin member (second region) appears to be colored depending on the viewpoint position.

In the above light-transmitting resin member, the pitch of the grooves may be a regular pitch.

In the above light-transmitting resin member, in a case where the regular pitch is set as a, a≤200 nm may be satisfied.

In such a configuration, in a case where the pitch of the grooves is the regular pitch, the color appearance can be inhibited in which the light-transmitting resin member (first region) appears to be colored depending on the viewpoint position.

In the above light-transmitting resin member, the linear protrusion portions and the linear recess portions may extend in directions parallel with each other, an average value W1 of widths of the linear protrusion portions may satisfy 75 nm≤W1≤200 nm, an average value W2 of widths of the linear recess portions, the average value W2 being a width of the grooves, may satisfy 75 nm≤W2≤450 nm, a pitch P between the grooves neighboring each other may satisfy 150 nm≤P≤600 nm, an aspect ratio D/W2 of a depth D of the grooves to the width W2 of the grooves may satisfy 2.0≤D/W2, an angle θ1 of a side wall of the grooves relative to a reference plane may satisfy 60°≤θ1≤90°, and a contact angle θ2 of water relative to the surface in which the grooves are not formed may satisfy 60°≤θ2≤90°.

In such a configuration, an expected anti-fogging effect can be exhibited while the transmittance of light is inhibited from being diminished due to the groove structure.

In the above light-transmitting resin member, a width W1 of the linear protrusion portions and a width W2 of the linear recess portions may be almost the same.

In the above light-transmitting resin member, the light-transmitting resin member may be a light-transmitting resin member through which light radiated from a light source of a vehicle lighting tool is transmitted, and the linear protrusion portions and the linear recess portions may be formed in a back surface of the light-transmitting resin member.

In the above light-transmitting resin member, a material of the light-transmitting resin member may be an acrylic resin or a polycarbonate.

Advantageous Effects of Invention

The present invention can provide a light-transmitting resin member that can inhibit color appearance in which the light-transmitting resin member appears to be colored depending on a viewpoint position.

BRIEF DESCRIPTION OF THE DRAWINGS

FIG. 5 is a table which summarizes presence, absence, and so forth of an anti-fogging effect of samples S1 to S6 with different aspect ratios D/W2 and different groove angles θ1;

FIG. 6 is a table which summarizes data and so forth of the samples S1 to S6;

FIG. 7 illustrates photographs in which the samples S1 to S6 are photographed;

FIG. 8 is a table which summarizes presence or absence of the anti-fogging effect and so forth of the samples S1 to S6;

FIG. 19 is a table which summarizes groove pitches indicated in FIG. 18 and average transmittances;

FIG. 21 is a table which summarizes groove pitches indicated in FIG. 20 and average transmittances;

FIG. 22 is a table which summarizes a relationship between the surface roughness Ra of the metal mold and an assumed mold release resistance ratio in a case where the grooves formed in the outer lens 10A are at irregular pitches (see reference characters b1 and b2 in FIG. 14C);

FIG. 23 is a table which summarizes results (anti-fogging properties) obtained by performing an anti-fogging effect confirmation test for samples S7 to S10 with different groove pitches;

DESCRIPTION OF EMBODIMENTS

First Embodiment

Figure 1:
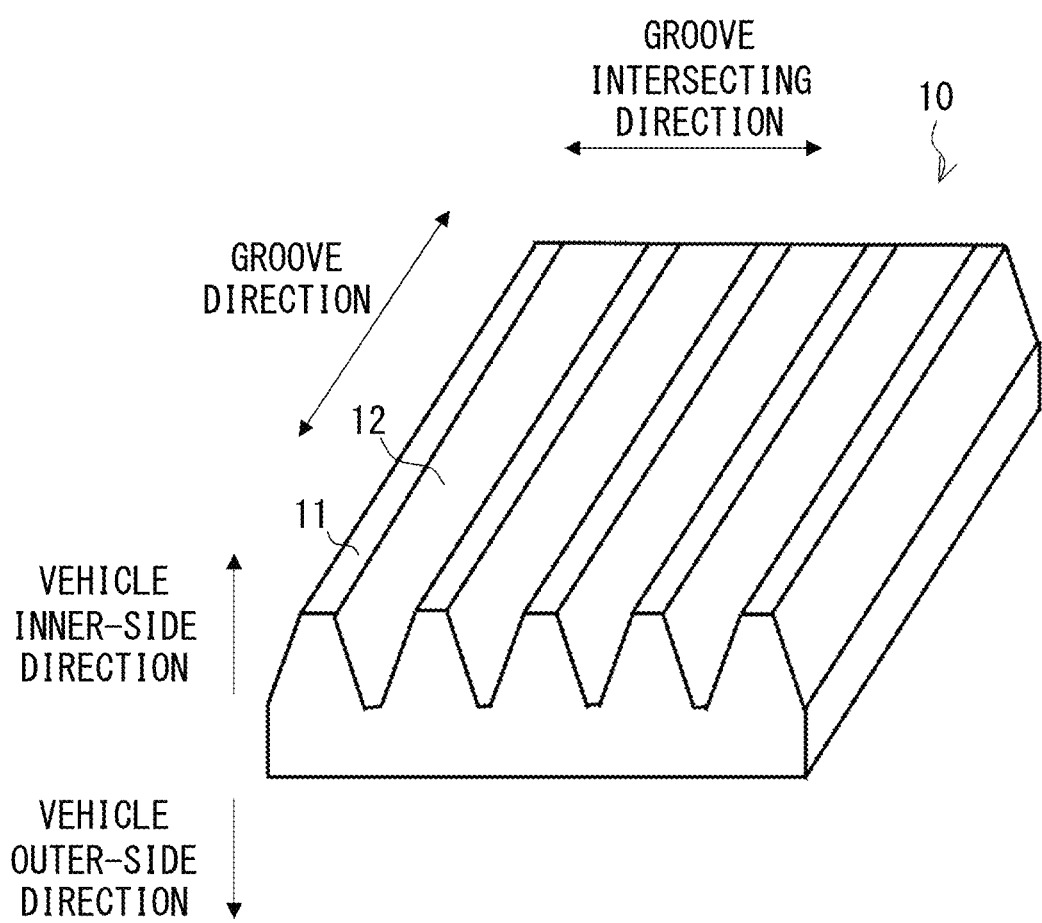
FIG. 1 is a partial perspective view (outline diagram) of a light-transmitting resin member 10.

Hereinafter, as a first embodiment, a light-transmitting resin member 10 that can exhibit an expected anti-fogging effect while inhibiting transmittance of light from being diminished due to a groove structure will be described with reference to the attached drawings. In the drawings, the same reference characters will be given to corresponding configuration elements, and descriptions thereof will not be repeated.

The light-transmitting resin member 10 of the first embodiment is used as an inner lens or an outer lens of a vehicle lighting tool (not illustrated), for example. The vehicle lighting tool is a vehicle headlight or a vehicle signal lighting tool (for example, a rear combination lamp), for example.

Figure 2:
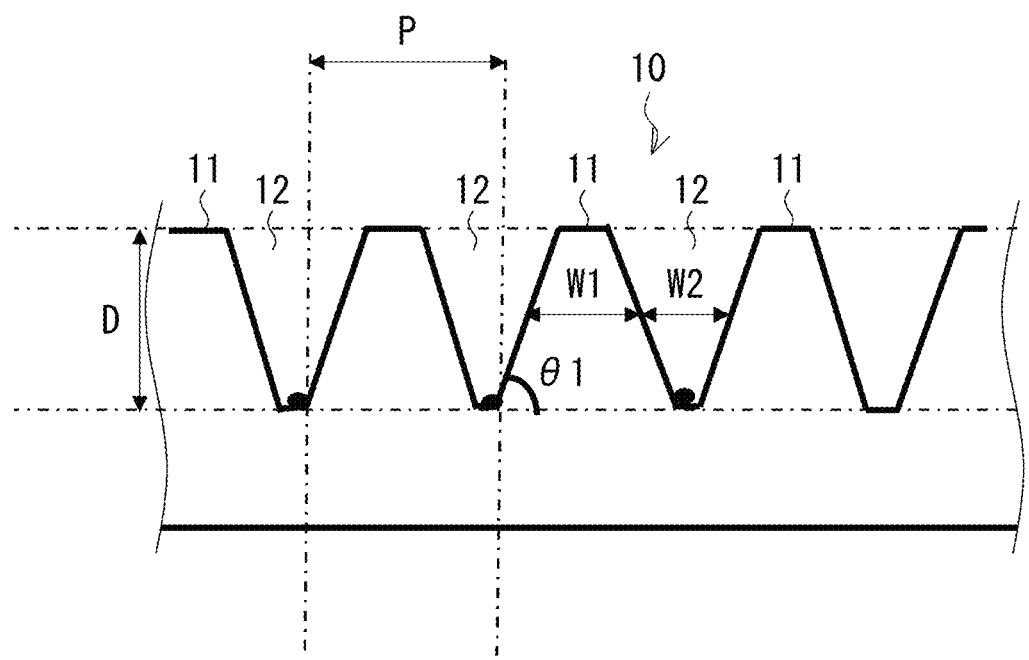
FIG. 2 is a partial cross-sectional view (outline diagram) of the light-transmitting resin member 10.

FIG. 1 is a partial perspective view (outline diagram) of the light-transmitting resin member 10. FIG. 2 is a partial cross-sectional view (outline diagram) of the light-transmitting resin member 10.

As illustrated in FIG. 1 and FIG. 2, a shape of the light-transmitting resin member 10 is a flat plate shape. Note that the shape of the light-transmitting resin member 10 is not limited to a flat plate shape and may be various shapes (for example, a curved shape) depending on a vehicle design or the like. A material of the light-transmitting resin member 10 is an acrylic resin (PMMA) or a polycarbonate.

A plurality of grooves (groove structure) are formed in a surface of the light-transmitting resin member 10. The surface of the light-transmitting resin member 10 is a surface on which light radiated from a light source (for example, a semiconductor light emitting element such as an LED which configures the vehicle lighting tool) of the vehicle lighting tool is incident (a surface to which the vehicle lighting tool (light source) is opposed). In the following, the surface of the light-transmitting resin member 10 will also be referred to as a back surface of the light-transmitting resin member 10. The grooves (groove structure) are configured with linear protrusion portions 11 (plural) and linear recess portions 12 (plural). The linear protrusion portion 11 and the linear recess portion 12 linearly extend in directions parallel with each other. Note that there may be a case where the linear protrusion portion 11 and the linear recess portion 12 curvedly extend in directions parallel with each other. In the following, as illustrated in FIG. 1, a direction in which the linear protrusion portion 11 and the linear recess portion 12 extend will be referred to as a groove direction. Further, a direction which intersects with (is orthogonal to) the groove direction will be referred to as a groove intersecting direction.

Figure 3:
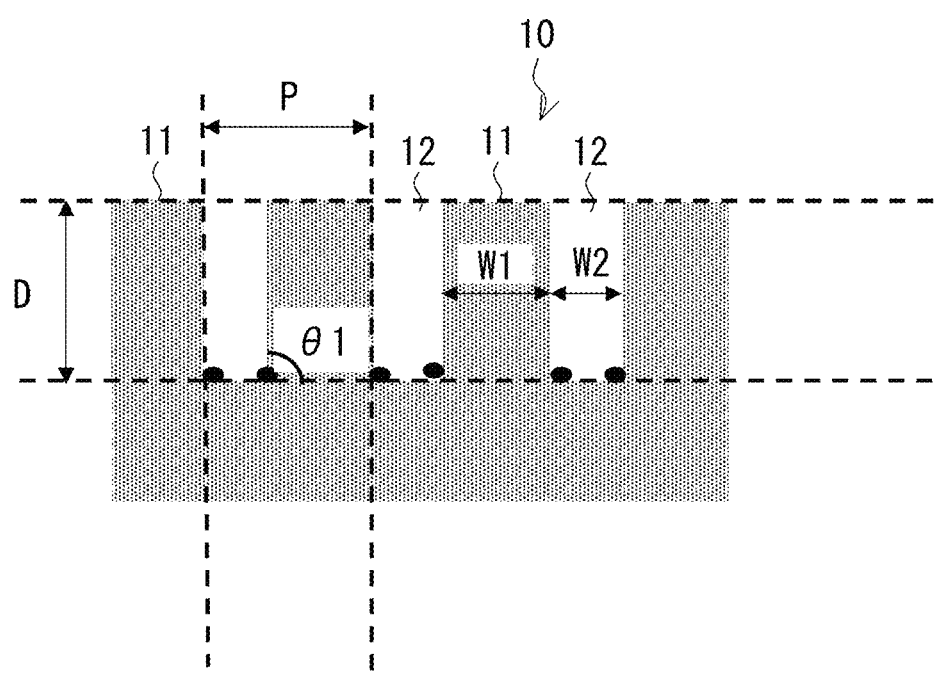
FIG. 3 illustrates an example of grooves (rectangular grooves) in a case where a groove angle θ1 is 90°.

An average value W1 of widths of the linear protrusion portions 11 (hereinafter, also referred to as a protrusion portion width W1) satisfies 75 nm≤W1≤200 nm ... (expression 1). An average value W2 of widths of the linear recess portions 12 (hereinafter, also referred to as a groove width W2) satisfies 75 nm≤W2≤450 nm ... (expression 2). A pitch P between the grooves neighboring each other (hereinafter, referred to as a groove pitch P) satisfies 150 nm≤P≤600 nm ... (expression 3). An aspect ratio D/W2 of a groove depth D to the groove width W2 satisfies 2.0≤D/W2 ... (expression 4). Note that the width W1 of the linear protrusion portion and the width W2 of a linear recess may be almost the same, that is, may satisfy W1≈W2. An angle θ1 of a side wall of the groove relative to a reference plane (hereinafter, referred to as a groove angle θ1) satisfies 60°≤θ1≤90° ... (expression 5). FIG. 2 illustrates an example of a groove (triangular groove) with the groove angle θ1 of 78°. FIG. 3 illustrates an example of a groove (rectangular groove) with the groove angle θ1 of 90°.

A contact angle θ2 (not illustrated) of water relative to the surface (a flat surface in which no groove is formed) of the light-transmitting resin member 10 falls within a range other than a range (60° or smaller) in which high hydrophilicity is obtained and a range (exceeding) 90° in which high water repellency is obtained, that is, 60°≤θ2≤90° ... (expression 6).

As for a resin material such as an acrylic resin or a polycarbonate, even when the same main agent is used, in order to improve various characteristics such as strength, thermal resistance, light transmission, and wettability, the resin material is caused to form a copolymer with another resin material, additives or structures are changed, and thereby there are many kinds for the same acrylic resin (or polycarbonate). By those effects, even the same acrylic resin (or polycarbonate) has different surface energy, and the contact angle of water with the surface can become various angles. Based on this, in the vehicle lighting tool such as the vehicle headlight or the vehicle signal lighting tool (for example, the rear combination lamp), strength, thermal resistance, light transmission properties are considered to be important, and the light-transmitting resin member 10 is used that is formed of a resin material such as an acrylic resin (or polycarbonate) which satisfies strength, thermal resistance, and light transmission properties demanded in the vehicle lighting tool. The contact angle θ2 of water with the surface (a flat surface in which no groove is formed) of the light-transmitting resin member 10, which is formed of the resin material such as an acrylic resin (or polycarbonate) which satisfies such strength, thermal resistance, and light transmission properties demanded in the vehicle lighting tool, satisfies 60°≤θ2≤90°.

Note that the contact angle θ2 of water can be measured by a contact angle meter (for example, a portable contact angle meter PCA-11 of Kyowa Interface Science Co., Ltd.), for example. Note that the fact that the range in which high hydrophilicity is obtained is 60° or smaller and the fact that the range in which the high water repellency is obtained exceeds 90° are disclosed in the above Patent Literature 1, for example.

The grooves (groove structure) in the above configuration can be formed by carrying out heat imprint for a light-transmitting resin base material, for example. Further, the grooves (groove structure) in the above configuration can be formed by molding (injection molding) the light-transmitting resin member 10 by using a metal mold.

By using the light-transmitting resin member 10 which satisfies the above expression 1 to expression 6, while the transmittance of light (the transmittance of the light radiated from the vehicle lighting tool) is inhibited from being diminished due to the groove structure, the expected anti-fogging effect (the anti-fogging effect for the back surface of the light-transmitting resin member 10) can be exhibited. Further, by using the light-transmitting resin member 10 which satisfies the above expression 1 to expression 6, a liquid droplet adhering to the linear recess portion 12 is less likely to flow, a water droplet is stretched in the groove direction by a capillary force of the grooves (groove structure), a surface area of the water droplet is expanded, and evaporation of the water droplet is promoted. Accordingly, the water droplet is evaporated before being accumulated in the vehicle lighting tool, and the anti-fogging effect can thereby be exhibited.

The above expression 1, expression 2, and expression 4 to expression 6 are conditions for exhibition of the expected anti-fogging effect. In the following, a description will be made about an anti-fogging effect confirmation test (steam test) which was carried out by the inventors for deriving a part of a range of those conditions.

Anti-Fogging Effect Confirmation Test (Steam Test)

Figure 4:
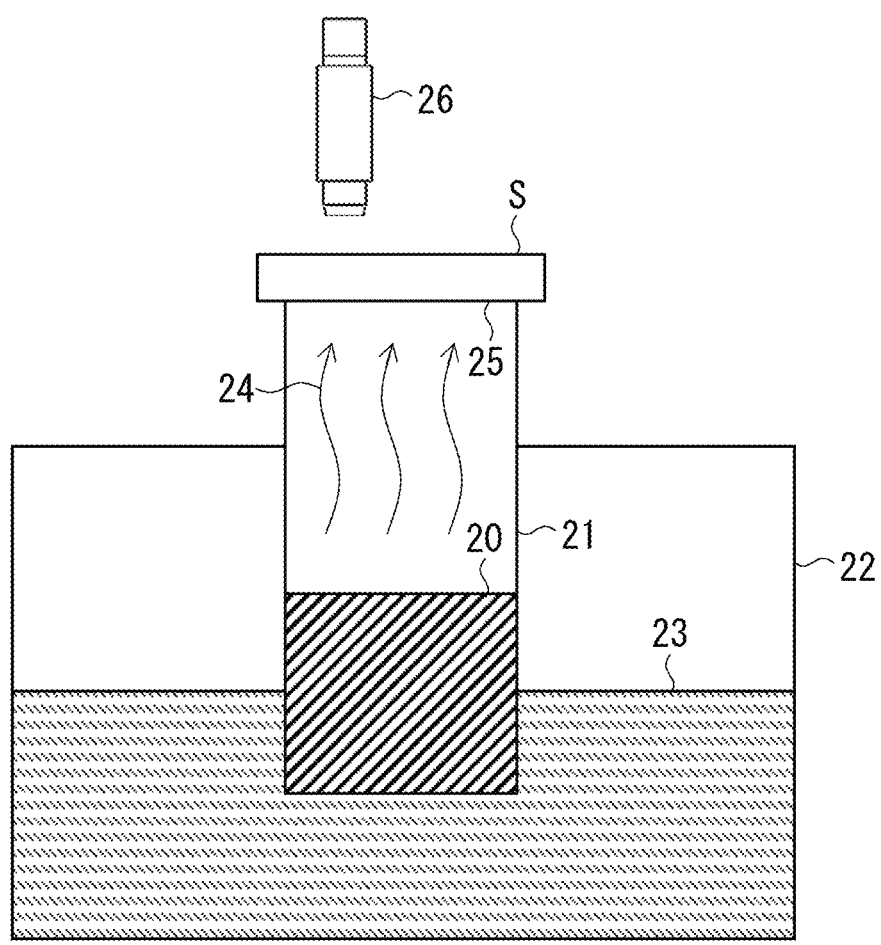
FIG. 4 is a diagram for explaining an anti-fogging effect confirmation test (steam test)

FIG. 4 is a diagram for explaining the anti-fogging effect confirmation test (steam test).

As illustrated in FIG. 4, in the anti-fogging effect confirmation test (steam test), a stainless steel bottle 21 in which a saline solution 20 (NaCl) was put was heated by hot water 23 (40° C.) in a hot water bath 22, vapor 24 (relative humidity 74% RH) was thereby produced, and the vapor 24 was caused to contact with a lower surface of samples S as the light-transmitting resin member 10. The samples S are samples S1 to S6 which will be described below. A lower surface 25 of the sample S includes a processed surface in which the groove structure is formed by heat imprint and a base surface (flat surface) in which no groove structure is formed.

An adhesion degree of water droplets which adhered to the lower surface 25 (the processed surface and the base surface) of the sample S after one minute elapsed after vapor was produced was observed (photographed) by using a microscope camera 26 with an objective lens.

FIG. 5 is a table which summarizes presence, absence, and so forth of the anti-fogging effect of the samples S1 to S6 with different aspect ratios D/W2 and different groove angles θ1. FIG. 6 is a table which summarizes data and so forth of the samples S1 to S6. Each of the samples S1 to S6 is a flat plate (60 mm square and a thickness of 2 mm) formed of an acrylic resin. The data and so forth of the samples S1 to S6 are as follows (see FIG. 5 and FIG. 6).

Sample S1

The sample S1 is a flat plate (60 mm square and a thickness of 2 mm) formed of an acrylic resin and has groove pitch P=300 nm, groove depth D=150 nm, groove width W2=150 nm, aspect ratio D/W2=1.0, and groove angle θ1=90°.

Sample S2

The sample S2 is a flat plate (60 mm square and a thickness of 2 mm) formed of an acrylic resin and has groove pitch P=300 nm, groove depth D=150 nm, groove width W2=150 nm, aspect ratio D/W2=1.0, and groove angle θ1=60°.

Sample S3

The sample S3 is a flat plate (60 mm square and a thickness of 2 mm) formed of an acrylic resin and has groove pitch P=300 nm, groove depth D=200 nm, groove width W2=150 nm, aspect ratio D/W2=1.3, and groove angle θ1=0°.

Sample S4

The sample S4 is a flat plate (60 mm square and a thickness of 2 mm) formed of an acrylic resin and has groove pitch P=300 nm, groove depth D=300 nm, groove width W2=150 nm, aspect ratio D/W2=2.0, and groove angle θ1=90°.

Sample S5

The sample S5 is a flat plate (60 mm square and a thickness of 2 mm) formed of an acrylic resin and has groove pitch P=300 nm, groove depth D=300 nm, groove width W2=150 nm, aspect ratio D/W2=2.0, and groove angle θ1=78°.

Sample S6

The sample S6 is a flat plate (60 mm square and a thickness of 2 mm) formed of an acrylic resin and has groove pitch P=150 nm, groove depth D=200 nm, groove width W2=75 nm, aspect ratio D/W2=2.7, and groove angle θ1=90°.

As a result of the test using the above samples S4 and S5, it can be understood that in a case where the aspect ratio is 2.0, at either one of groove angle θ1=78° and groove angle θ1=90°, the expected anti-fogging effect is exhibited. This is considered to be because the water droplet was stretched in the groove direction and the groove intersecting direction by the capillary force of the grooves (groove structure), the surface area of the water droplet was expanded, and evaporation of the water droplet was consequently promoted. Note that it can be understood that the sample (sample 4) having groove angle θ1=90° (rectangular groove) gives more satisfactory results because both of a water droplet density and a water droplet area ratio are low, but a water droplet size becomes as large as approximately 100 μm, and the water droplets are more likely to be observed by the naked eye.

FIG. 7 illustrates photographs in which the samples S1 to S6 are photographed. In FIG. 7, a region A1 higher than a straight line L represents the processed surface in which the groove structure is formed, and a region A2 lower than the straight line L represents the base surface (flat surface) in which no groove structure is formed. Further, in FIG. 7, circles (plural) and ellipses (plural) which appear to be white represent the water droplets, and a direction in which the straight line L extends represents a direction in which the grooves extend. FIG. 8 is a table which summarizes presence or absence of the anti-fogging effect and so forth of the sample S1 to S6. Presence or absence of the anti-fogging effect in FIG. 8 is evaluated by an evaluation method which will be described in the following.

Evaluation Method of Presence or Absence of Anti-Fogging Effect

Figure 9:
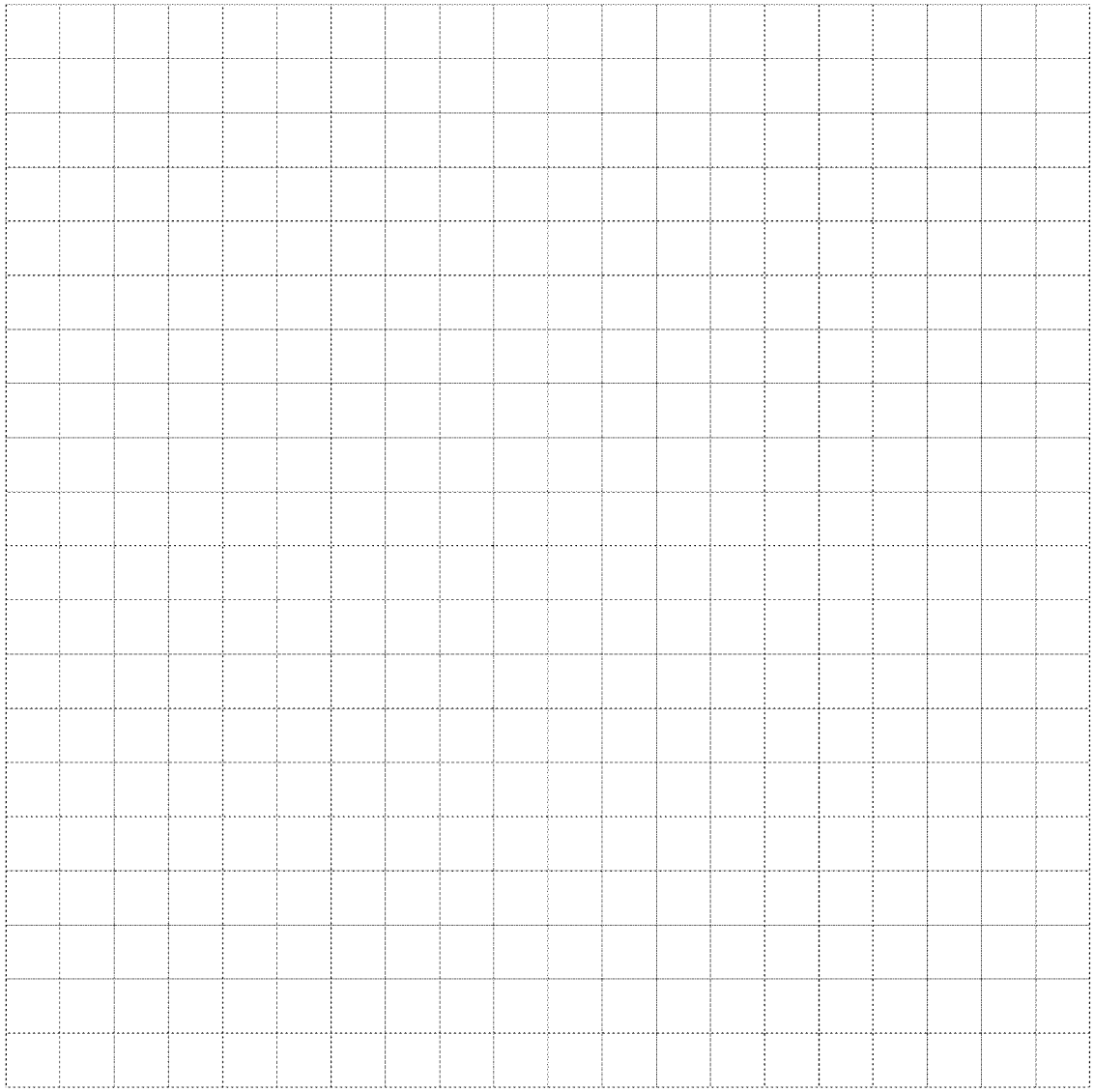
FIG. 9 illustrates one example of lattice-like squares.
Figure 10:
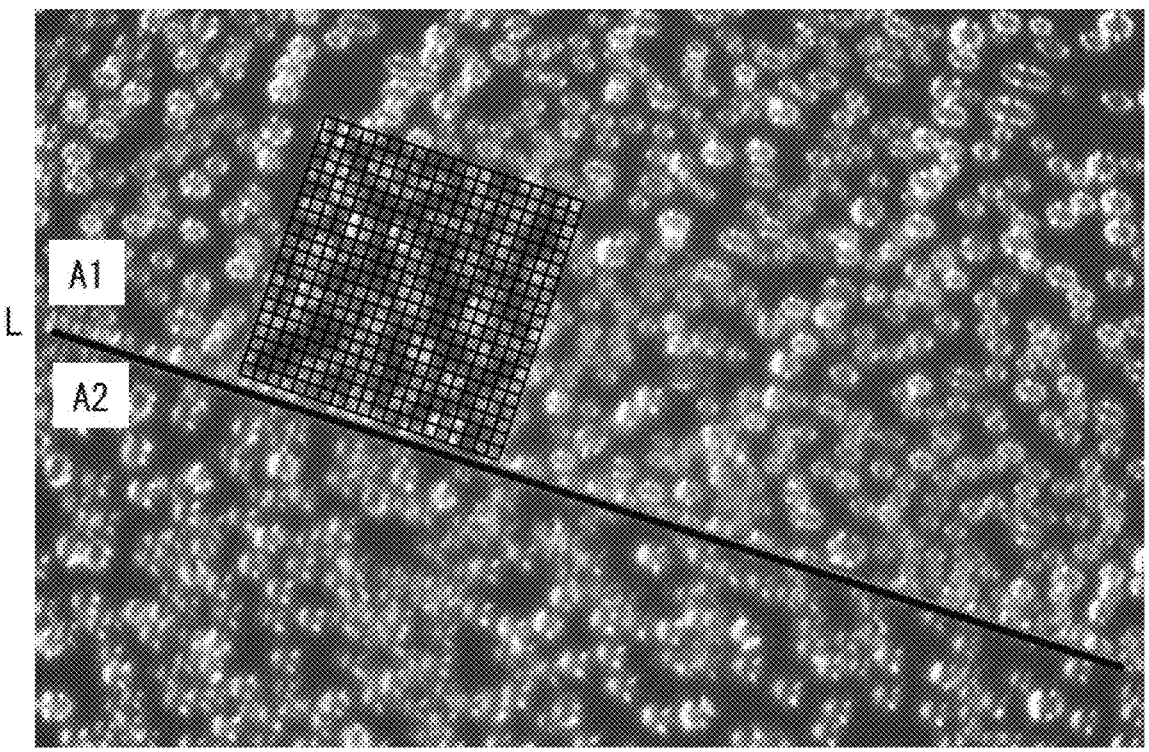
FIG. 10 illustrates an example of use of the lattice-like squares.

First, a "liquid droplet area (processed surface)" in FIG. 8 is calculated. The "liquid droplet area (processed surface)" represents the ratio of occupation by the water droplets adhering to the processed surface in which the groove structure is formed. The "liquid droplet area (processed surface)" can be calculated by using lattice-like squares (for example, 20×20 squares) illustrated in FIG. 9, for example. FIG. 9 illustrates one example of the lattice-like squares. The lattice-like squares are used by superimposing those on a photograph as illustrated in FIG. 10. FIG. 10 illustrates an example of use of the lattice-like squares. Specifically, the area occupied by the water droplets adhering to the processed surface in which the groove structure is formed is measured by the number of squares, and the ratio to all of the lattice-like squares (for example, 400 squares) (the number of squares for the water droplets (the net number of squares)/400) is calculated. Note that as for a measured area, not an area in which water droplet distributions are small but an area which has the most water droplets is selected by visual inspection. A measurement error is approximately 2% to 3%.

Next, a "liquid droplet area (base surface)" in FIG. 8 is calculated. The "liquid droplet area (base surface)" represents the ratio of occupation by the water droplets adhering to the base surface in which no groove structure is formed. Similarly to the "liquid droplet area (processed surface)", the "liquid droplet area (base surface)" can be calculated by using the lattice-like squares (for example, 20×20 squares) illustrated in FIG. 9.

Next, a "liquid droplet abundance ratio" in FIG. 8 is calculated. The "liquid droplet abundance ratio" can be calculated by ("liquid droplet area (processed surface)"/"liquid droplet area (base surface)")×100.

For example, as for the sample 4, the ratio of water droplet adhesion which was able to be reduced compared to the base surface can be calculated as a water droplet abundance ratio (100%) of the base surface−the "liquid droplet abundance ratio" (16.8%) of the processed surface=83.2%. Similar calculation can be performed for other samples 1~3, 5, and 6.

In the first embodiment, for the samples (here, the samples 4 to 6) in which the ratio of water droplet adhesion of the processed surface which was able to be reduced compared to the base surface, that is, the water droplet abundance ratio (100%) of the base surface−the "liquid droplet abundance ratio" of the processed surface satisfies an evaluation criterion (for example, 50% or higher), those samples were evaluated as "ANTI-FOGGING EFFECT PRESENT" about the expected anti-fogging effect. The other samples (here, the samples 1 to 3) were evaluated as "NO ANTI-FOGGING EFFECT" about the expected anti-fogging effect. For example, in a case of the sample 4 in FIG. 8, because the liquid droplet area of the processed surface is 9.8% and the liquid droplet area of the base surface is 58.5%, the liquid droplet abundance ratio (processed surface-base surface×100) is 16.8%. In other words, it can be understood that when the area of liquid droplets adhering to the processed surface is compared to the area of liquid droplets adhering to the base surface, only water droplets of 16.8% adhere to the processed surface. Consequently, it can be understood that an adhesion amount of liquid droplets is decreased by (100%−16.8%=) 83.2% compared to the base surface. Note that the evaluation criterion is not limited to 50% or higher and may be another numerical value or higher.

The above expression 3 is a condition for inhibiting the transmittance of light (the transmittance of the light radiated from the vehicle lighting tool) from being diminished due to the groove structure. In the following, a description will be made about a simulation which was carried out by the inventors for deriving the condition and which used predetermined software (the Wave Optics Module produced by COMSOL, Inc.).

Transmittance Diminishment Inhibition
(Simulation)

Figure 11A:
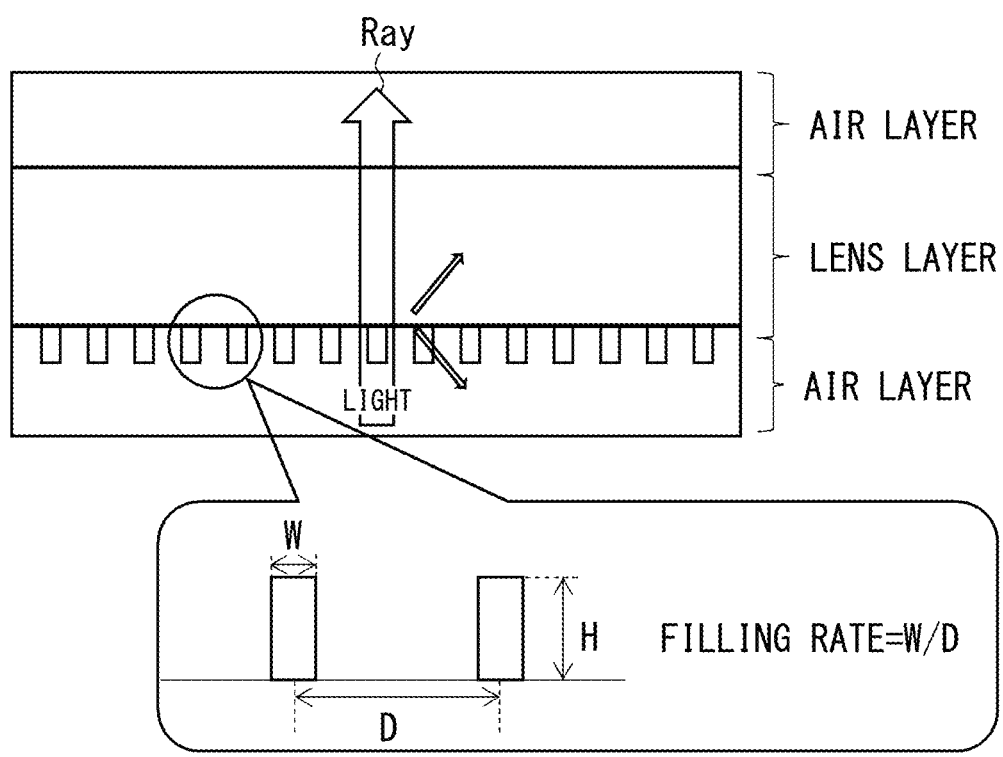
FIG. 11A illustrates an example of a rectangular groove with filling rate=groove width W/groove pitch D=0.4 and groove height H=400 nm.

FIG. 11A illustrates an example of a rectangular groove with filling rate=groove width W/groove pitch D=0.4 and groove height H=400 nm. In FIG. 11A, in a lower surface of a lens layer (having a similar size to the samples S1 to S6), a plurality of grooves (groove structure) are formed. The grooves (groove structure) are configured with protrusion portions (plural) protruding from the lower surface of the lens layer and recess portions (plural).

Figure 11B:
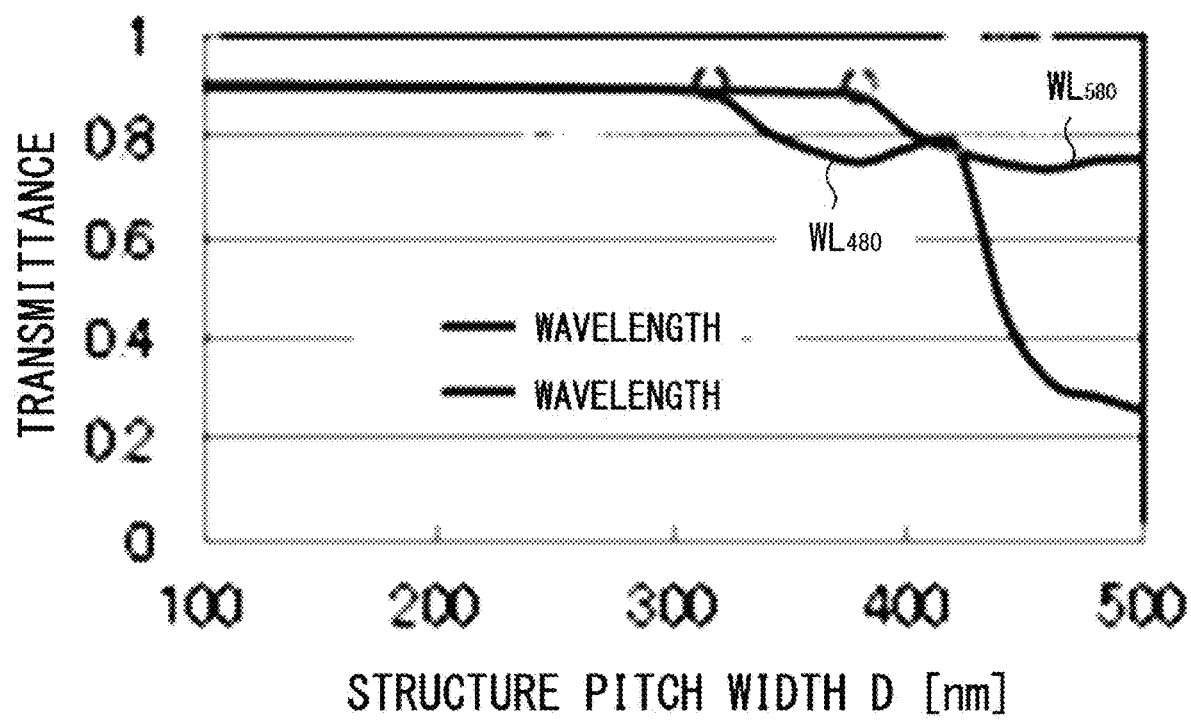
FIG. 11B is a graph representing transmittance (simulation results) of light Ray in a case where the groove pitch D indicated in FIG. 11A is changed.

FIG. 11B is a graph representing transmittance (simulation results) of light Ray (see FIG. 11A) in a case where the groove pitch D indicated in FIG. 11A is changed. In FIG. 11B, a reference character $WL_{480}$ represents transmittance (simulation result) of light at a wavelength of 480 nm, and a reference character $WL_{580}$ represents transmittance (simulation result) of light at a wavelength of 580 nm.

Referring to FIG. 11B, it can be understood that as for the light at a wavelength of 480 nm, the transmittance is generally constant to a position where the groove pitch D becomes 300 nm but the transmittance lowers in a section where the groove pitch D is 300 nm or greater. Further, it can be understood that as for the light at a wavelength of 580 nm, the transmittance is generally constant to a position where the groove pitch D becomes 360 nm but the transmittance lowers in a section where the groove pitch D is 360 nm or greater.

From the above results, it can be understood that as for visible light at a wavelength of 480 nm or greater, the transmittance can be inhibited from being diminished by setting the groove pitch D to 480 nm×0.62=300 nm or smaller. Further, it can be understood that as for visible light at a wavelength of 580 nm or greater, the transmittance can be inhibited from being diminished by setting the groove pitch D to 580 nm×0.62=360 nm or smaller. Note that a value of 0.62 is a coefficient which is calculated by 300 nm/480 nm or 360 nm/580 nm.

Based on the above, it can be understood that in a case where visible light at a wavelength of 380 nm or greater is desired to be transmitted (for example, a case where the light-transmitting resin member 10 is used as an inner lens or an outer lens of the vehicle headlight), the transmittance can be inhibited from being diminished by setting the groove pitch D to 380 nm×0.62≈235 nm or smaller. In such a case, it is desirable that a lower limit value be 150 nm or greater such that a part of ultraviolet light can be transmitted.

Further, it can be understood that in a case where visible light at a wavelength of 630 nm or greater (red visible light) is desired to be transmitted (for example, a case where the light-transmitting resin member 10 is used as an inner lens or the outer lens of the vehicle signal lighting tool), the transmittance can be inhibited from being diminished by setting the groove pitch D to 630 nm×0.62≈390 nm or smaller.

Figure 12:
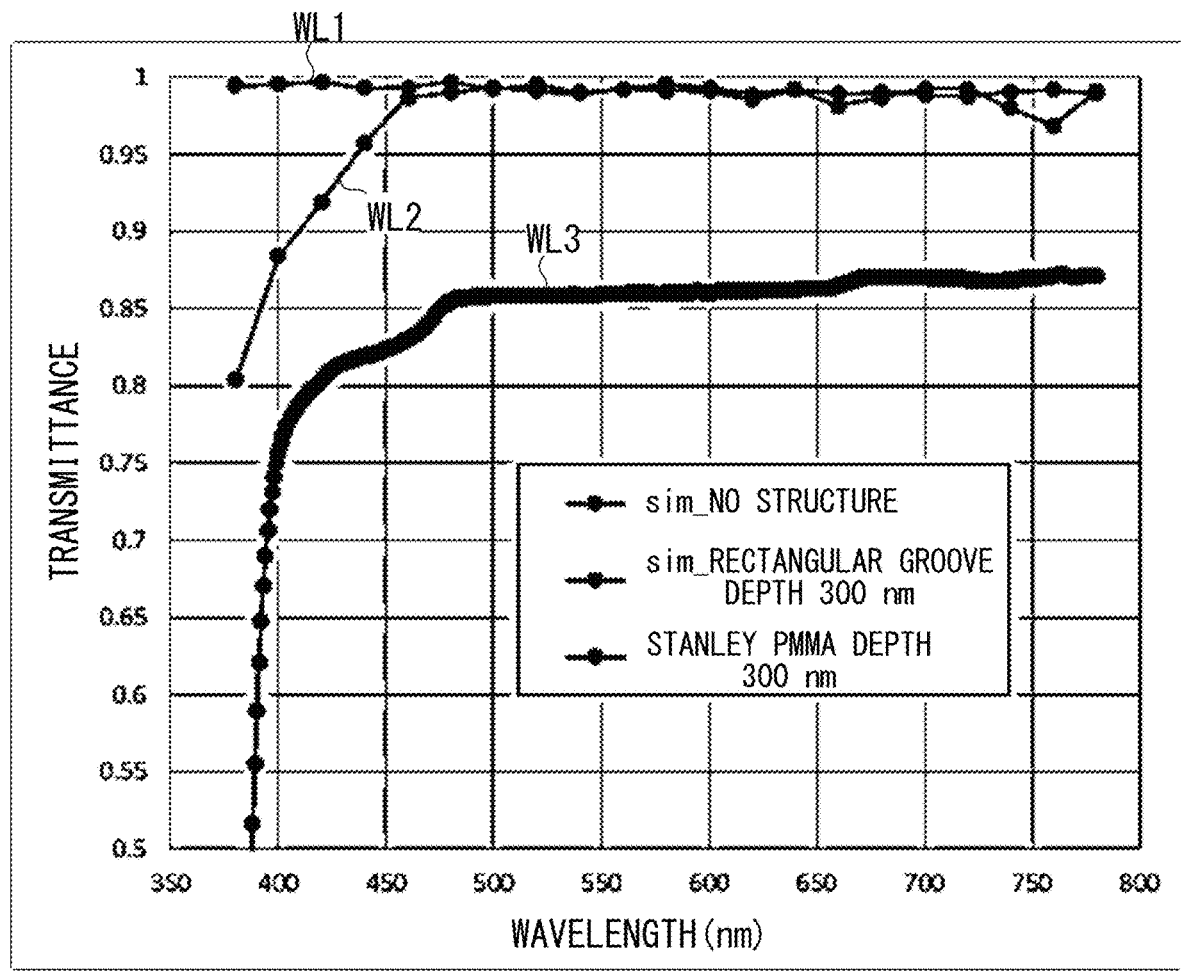
FIG. 12 is a graph representing transmittance actual measurement results.

Further, it can be understood that in a case where visible light at a wavelength of 580 nm or greater (amber visible light) is desired to be transmitted (for example, a case where the light-transmitting resin member 10 is used as the inner lens or the outer lens of the vehicle signal lighting tool), the transmittance can be inhibited from being diminished by setting the groove pitch D to 580 nm×0.62≈360 nm or smaller. FIG. 12 is a graph representing transmittance actual measurement results.

In FIG. 12, a reference character WL1 represents the transmittance (simulation result) in a case where no groove structure is present, a reference character WL2 represents the transmittance (simulation result) in a case where the groove structure is present (rectangular grooves and a groove depth of 300 nm), and a reference character WL3 represents an actual measurement result in a case where the groove structure is present (aspect ratio=2, groove width=150 nm, groove depth=300 nm, groove pitch=300 nm, and groove angle θ1=78°).

Referring to FIG. 12, it can be understood that a drop of the transmittance (actual measurement result) is positioned around a wavelength of 480 nm and this agrees with the simulation result (484=300/0.62). Further, it can be understood that about 85% of visible light at a wavelength of 480 nm or greater (actual measurement result) is transmitted and the transmittance can be inhibited from being diminished.

As described above, the first embodiment can provide the light-transmitting resin member 10 which can exhibit the expected anti-fogging effect while inhibiting the transmittance of light from being diminished due to the groove structure.

The transmittance of light can be inhibited from being diminished due to the groove structure because the above expression 3 is employed.

The expected anti-fogging effect can be exhibited because the above expression 1, expression 2, and expression 4 to expression 6 are employed.

Further, in the first embodiment, in a case where the light-transmitting resin member 10 is used as the inner lens or the outer lens of the vehicle headlight, the groove pitch D is set to 380 nm×0.62≈235 nm or smaller, and the expected anti-fogging effect can thereby be exhibited while the transmittance of light (the transmittance of the light (visible light at 380 nm or greater) radiated from the vehicle headlight) is inhibited from being diminished.

Further, in the first embodiment, in a case where the light-transmitting resin member 10 is used as the inner lens or the outer lens of the vehicle signal lighting tool, the groove pitch D is set to 630 nm×0.62≈390 nm or smaller, and the expected anti-fogging effect can thereby be exhibited while the transmittance of light (the transmittance of the light (red visible light at 630 nm or greater) radiated from the vehicle signal lighting tool) is inhibited from being diminished.

Further, in the first embodiment, in a case where the light-transmitting resin member 10 is used as the inner lens or the outer lens of the vehicle signal lighting tool, the groove pitch D is set to 580 nm×0.62≈360 nm or smaller, and the expected anti-fogging effect can thereby be exhibited while the transmittance of light (the transmittance of the light (amber visible light at 580 nm or greater) radiated from the vehicle signal lighting tool) is inhibited from being diminished.

Next, modifications will be described.

In the above first embodiment, a description is made about an example where the light-transmitting resin member 10 is used as the inner lens or the outer lens of the vehicle headlight or the vehicle signal lighting tool, but this is not restrictive.

For example, the light-transmitting resin member 10 may be used as a light-transmitting resin member through which light (at a wavelength of approximately 1 to 10 μm) is transmitted, the light being emitted from a light source for a radar (for example, infrared LiDAR as a distance measuring element). In this case, the groove pitch D is set to 780 nm (upper limit wavelength of visible light)×0.62≈483 nm or smaller, and the expected anti-fogging effect can thereby be exhibited while the transmittance of light (the transmittance of light (light at 780 nm or greater) radiated from the light source for the radar) is inhibited from being diminished.

Further, in the above first embodiment, a description is made about an example where a cross-sectional shape of a distal end portion of the linear protrusion portion 11 has a flat surface (see FIG. 2 and FIG. 3), but this is not restrictive.

Figure 13:
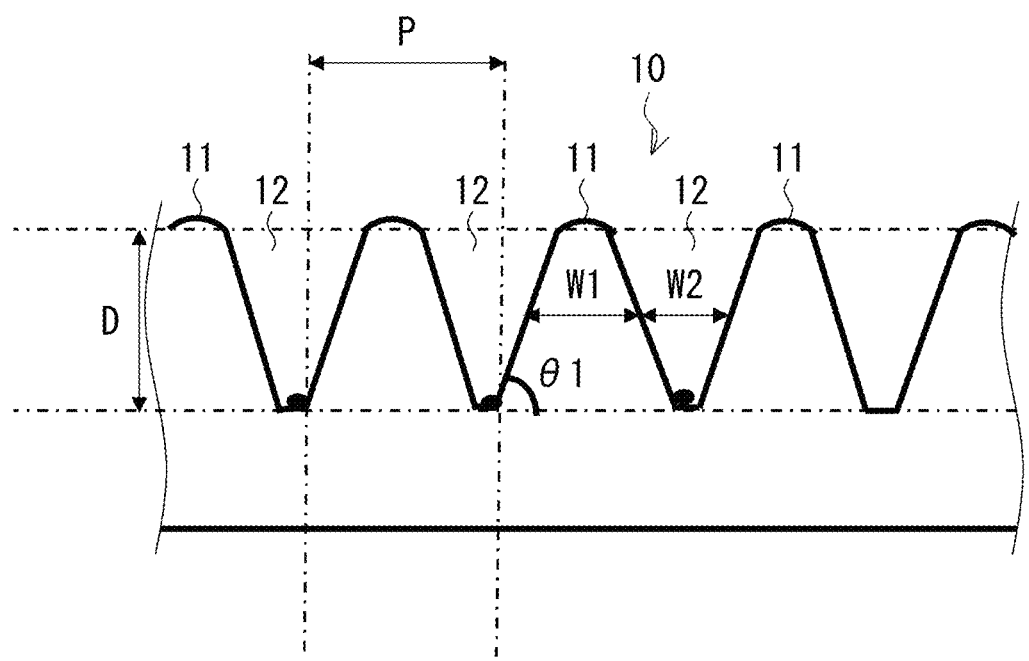
FIG. 13 illustrates a modification of a cross-sectional shape of a distal end portion of a linear protrusion portion 11.

FIG. 13 illustrates a modification of the cross-sectional shape of the distal end portion of the linear protrusion portion 11.

As illustrated in FIG. 13, the cross-sectional shape of the distal end portion of the linear protrusion portion 11 may be a circular arc shape which protrudes toward the outside.

Accordingly, a contact angle with a water droplet becomes small by the protruding circular arc shape of the distal end portion of the linear protrusion portion 11, the surface area of the water droplet is expanded, as a result, evaporation of the water droplet is promoted, and the anti-fogging effect can thus be improved.

Second Embodiment

Next, a light-transmitting resin member of a second embodiment will be described. The light-transmitting resin member of the second embodiment is an example of the light-transmitting resin member of the above first embodiment which is applied to an outer lens. In the following, the outer lens will be referred to as an outer lens 10A.

Figure 14A:
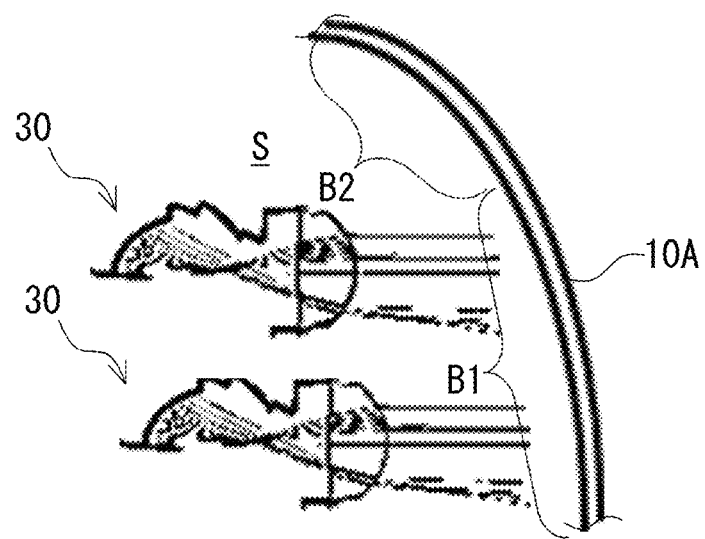
FIG. 14A illustrates one example of an outer lens 10A.
Figure 14B:
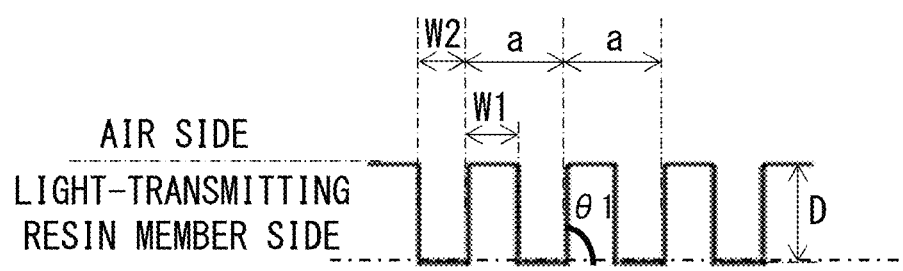
FIG. 14B illustrates one example of grooves which are formed at a regular pitch a in the outer lens 10A.
Figure 14C:
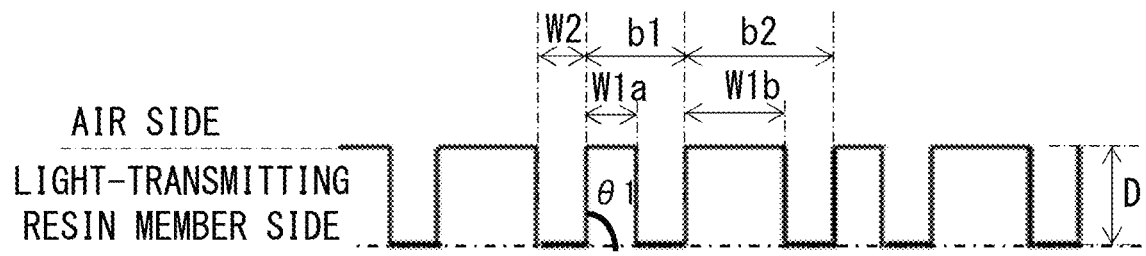
FIG. 14C illustrates one example of grooves which are formed at irregular pitches b1 and b2 (b1<b2) in the outer lens 10A.

FIG. 14A illustrates one example of the outer lens 10A, FIG. 14B illustrates one example of grooves which are formed at a regular pitch a in the outer lens 10A, and FIG. 14C illustrates one example of grooves which are formed at irregular pitches b1 and b2 (b1<b2) in the outer lens 10A.

The outer lens 10A is mounted on a housing (not illustrated) and configures a lighting chamber S, in which a lighting tool unit 30 is arranged, between the outer lens 10A and the housing. The lighting tool unit 30 is a projector type lighting tool unit, for example. This is not restrictive, and the lighting tool unit 30 may be a reflector type lighting tool unit, may be a direct projection type (so-called direct radiation type) lighting tool unit, may be a lighting tool unit which uses a light guide body (for example, a light guide rod or a light guide plate), or may be another lighting tool unit. Further, the lighting tool unit 30 may be an optical unit for a head lamp, may be a lighting tool unit for the vehicle signal lighting tool, or may be another lighting tool unit. The lighting tool unit 30 is one example of a vehicle lighting tool of the present invention.

The light-transmitting resin member (outer lens 10A) of the second embodiment is different compared to the light-transmitting resin member 10 of the above first embodiment mainly in the following point.

That is, in the light-transmitting resin member 10 of the above first embodiment, the grooves (groove structure) are formed at the regular pitch in the surface of the light-transmitting resin member 10; however, the light-transmitting resin member (outer lens 10A) of the second embodiment is different from the above first embodiment in the point that grooves (groove structure) are formed at a regular pitch a (see FIG. 14B) in a first region B1 (see FIG. 14A) in a surface of the light-transmitting resin member (outer lens 10A) and are formed at irregular pitches b1 and b2 (see FIG. 14C) in a second region B2 (see FIG. 14A) other than the first region B1 in the surface of the light-transmitting resin member (outer lens 10A).

The first region B1 is a region which contributes to optical characteristics of the lighting tool unit 30. Specifically, the first region B1 is mainly a region, in the surface of the outer lens 10A, which light radiated by the lighting tool unit 30 is incident on and is transmitted through and which influences optical identification. On the other hand, the second region B2 is a region which does not contribute to the optical characteristics of the lighting tool unit 30. Specifically, the second region B2 is mainly a region other than the first region B1 in the surface of the outer lens 10A.

A groove pitch of the grooves formed in the first region B1 is the regular pitch a (see FIG. 14B). In the following, the groove pitch will also be referred to as a first pitch a. Meanwhile, groove pitches of the grooves formed in the second region B2 is the irregular pitches b1 and b2 (see FIG. 14C). In the following, those groove pitches will also be referred to as a second pitch b1 and a third pitch b2.

An average pitch $((b1+b2)/2)$ of the grooves formed in the second region B2 is larger than the first pitch a. That is, there is a relationship of $a<(b1+b2)/2$ ... (expression 7). The expression 7 is a condition for making small a mold release resistance in a case where the outer lens 10A is molded (injection molding) by using a metal mold.

Further, there is a relationship of $a \leq 200$ nm ... (expression 8). The expression 8 is a condition for inhibiting color appearance in which the outer lens 10A (first region B1) appears to be colored depending on a viewpoint position E (see FIG. 16).

Further, in addition to the condition of the expression 7, in a case where a maximum pitch of the grooves formed in the second region B2 is set as $b(max)$, a minimum pitch of the grooves formed in the second region B2 is set as $b(min)$, and an average pitch of the grooves formed in the second region B2 is set as $b(ave)$, there is a relationship of $\{b(max)-b(min)\}/b(ave) \geq 0.16$ ... (expression 9). The expression 9 is a condition for inhibiting the color appearance in which the outer lens 10A (second region B2) appears to be colored depending on the viewpoint position E (see FIG. 16).

As described above, in the second embodiment, in the first region B1, the grooves are formed at the regular pitch a (see FIG. 14B) which satisfies the above expression 8. Meanwhile, in the second region B2, the grooves are formed at the irregular pitches b1 and b2 (see FIG. 14C) which satisfy the above expression 7 and expression 9.

In a case where the outer lens 10A is molded (injection molding) by using a metal mold, the mold release resistance can be made small by satisfying the above expression 7. Further, by satisfying the above expression 8 and expression 9, the color appearance can be inhibited in which the outer lens 10A (first region B1 and second region B2) appears to be colored depending on the viewpoint position E (see FIG. 16). In addition, by satisfying the expression 1 to expression 6 which are described in the above first embodiment, anti-fogging properties (expected anti-fogging effect) are realized.

In the following, a description will be made about simulations which were carried out by the inventors for deriving the above expression 7 to expression 9.

Figure 15A:
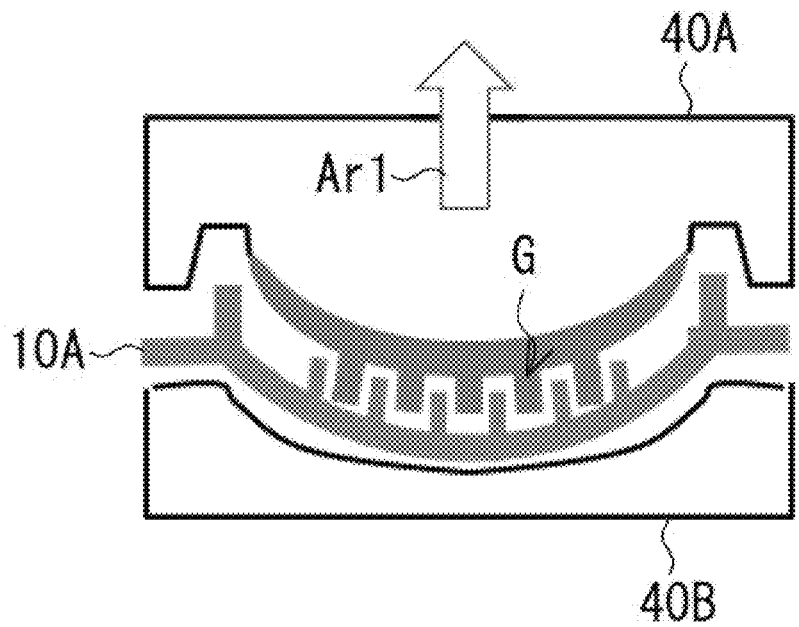
FIG. 15A illustrates a situation where after a resin (a resin material such as an acrylic resin or a polycarbonate) poured into metal molds 40A and 40B is cooled and solidified, the metal mold 40A is detached from a molded article (here, the outer lens 10A) in an arrow Ar1 direction.

FIG. 15A illustrates a situation where after a resin (a resin material such as an acrylic resin or a polycarbonate) poured into metal molds 40A and 40B is cooled and solidified, the metal mold 40A is detached from a molded article (here, the outer lens 10A) in an arrow Ar1 direction.

As illustrated in FIG. 15A, in a case where the outer lens 10A in which the grooves (see a reference character G in FIG. 16) are formed is molded (injection molding), when the metal mold 40A is being detached from the molded article, the mold release resistance becomes large. The mold release resistance denotes a force of the molded article to tightly stick to and remain on the metal mold 40B. Thus, there are cases where when the metal mold 40A is detached from the molded article, a force larger than the mold release resistance is exerted on the molded article and the molded article is deformed. Further, there are cases where the metal mold 40A cannot be detached from the molded article in the first place. Thus, it is desirable that the mold release resistance be small.

Figure 15B:
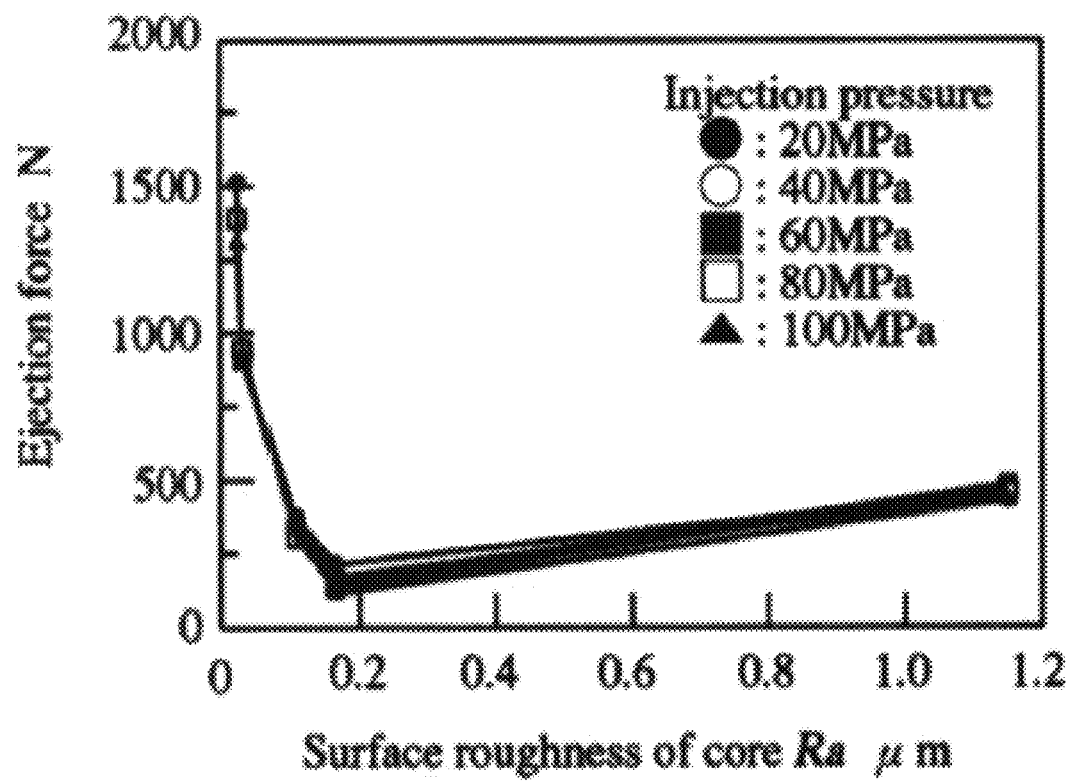
FIG. 15B is a graph representing a relationship between surface roughness Ra of the metal mold and a mold release resistance.

FIG. 15B is a graph representing a relationship between surface roughness Ra of the metal mold and the mold release resistance. The graph is cited from "Relationship between Core Surface Roughness and Ejection Force for Injection Molding", Yoshikazu Kobayashi et al., Journal of Japan Society for Precision Engineering, Vol. 67, No. 3, 2001. In FIG. 15B, the vertical axis represents the mold release resistance, and the horizontal axis represents the surface roughness Ra of the metal mold.

Referring to FIG. 15B, it can be understood that as the surface roughness Ra of the metal mold becomes larger, the mold release resistance becomes larger (the metal mold becomes less likely to be detached from the molded article). Note that in a case where the surface roughness Ra of the metal mold is close to zero, the mold release resistance contrarily becomes large. This is considered to be because in a case where the surface roughness Ra of the metal mold is close to zero, a surface of the metal mold becomes close to a mirror surface and a portion between the surface of the metal mold and the molded article becomes a vacuum state.

Here, making larger the groove pitch of the grooves formed in the outer lens 10A is equivalent to making smaller the surface roughness Ra of the metal mold. Thus, the groove pitch of the grooves formed in the outer lens 10A is made larger, and the mold release resistance in detaching the metal mold 40A from the molded article can thereby be made smaller.

However, there is a problem that when the groove pitch of the grooves formed in the outer lens 10A is made large, the transmittance of visible light transmitted through the outer lens 10A is changed, and due to that, the color appearance occurs in which the outer lens 10A appears to be colored depending on the viewpoint position E (see FIG. 16) relative to the outer lens 10A.

In the following, this point will be described by referring to results of a simulation (hereinafter, referred to as a simulation 1) which was performed by the inventors.

Figure 16:
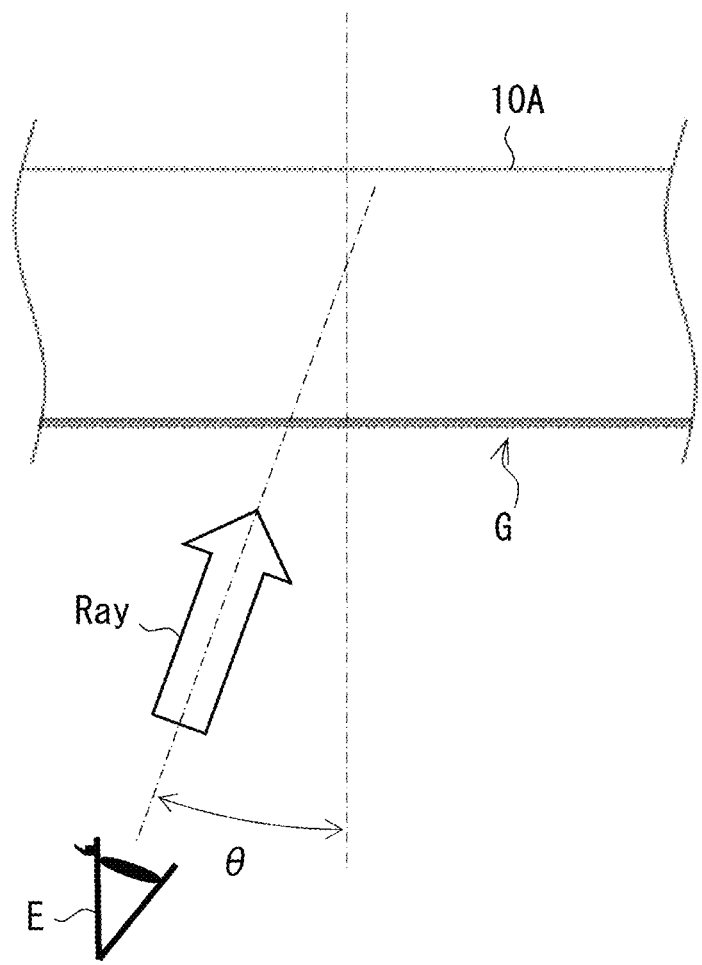
FIG. 16 is a diagram illustrating a situation where the light Ray (visible light) is incident on the outer lens 10A at an angle θ.
Figure 17A:
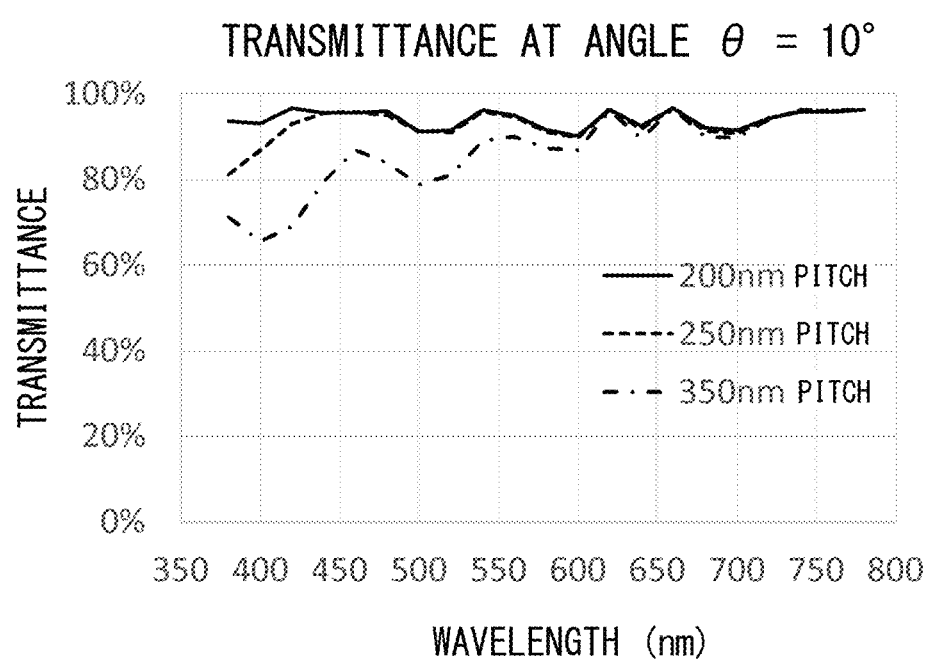
FIG. 17A is a graph representing results of a simulation 1.
Figure 17B:
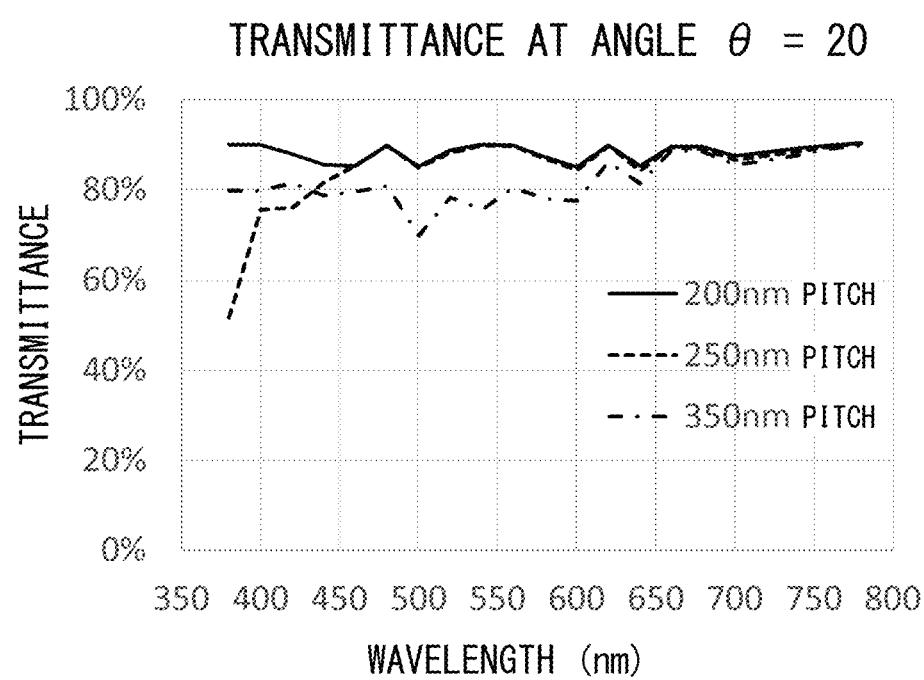
FIG. 17B is a graph representing the results of the simulation 1.
Figure 17C:
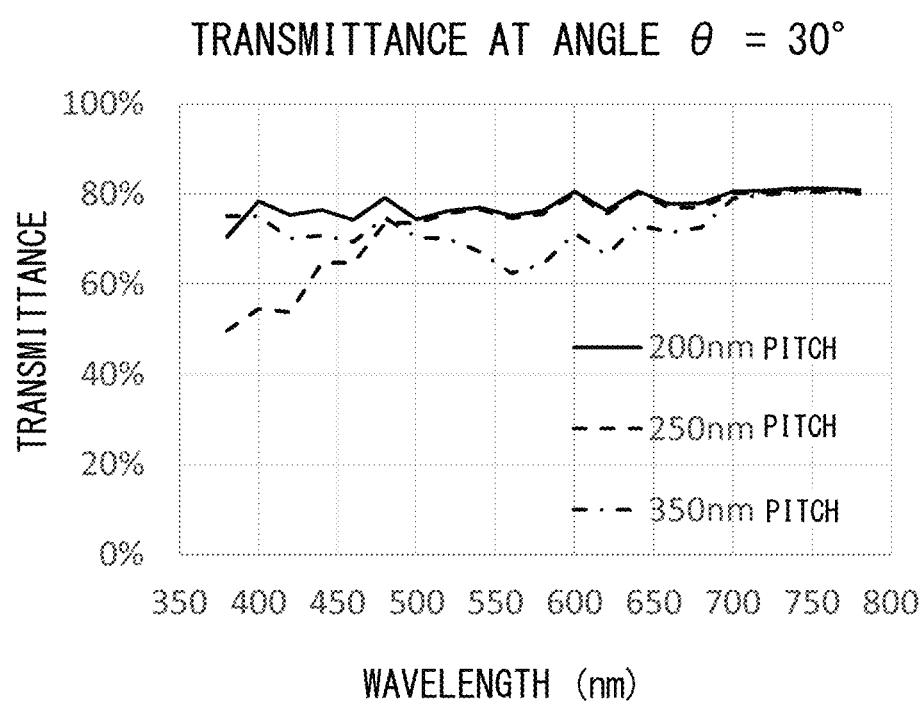
FIG. 17C is a graph representing the results of the simulation 1.

FIG. 16 is a diagram illustrating a situation where the light Ray (visible light) is incident on the outer lens 10A at an angle θ (incident angle). FIG. 17A is a graph representing the results of the simulation 1 in a case where the angle θ is 10°. FIG. 17B is a graph representing the results of the simulation 1 in a case where the angle θ is 20°. FIG. 17C is a graph representing the results of the simulation 1 in a case where the angle θ is 30°.

In the simulation 1, as illustrated in FIG. 16, the transmittance of the light Ray (visible light), which was incident on the outer lens 10A at the angle θ and was transmitted through the outer lens 10A, was simulated. Here, in all of simulations 1 to 4 described in the following, calculation was performed by COMSOL Multiphysics of COMSOL, Inc.

Specifically, with respect to each of the angles θ of 10°, 20°, and 30°, the simulation 1 was performed for three kinds of outer lenses 10A in which the grooves were formed at the regular pitches a (=200 nm, 250 nm, and 350 nm). Note that the groove depth, the groove width, the aspect ratio, the groove angle, and the protrusion portion width are common to those as groove depth D=200 nm, groove width W2=100 nm, aspect ratio D/W2=2.0, groove angle θ1=90°, and protrusion portion width W1=(a−W2) nm. Referring to FIG. 17A and FIG. 17B, it can be understood that in a case where the first pitch a is 200 nm, when the angles θ are 10°, 20°, and 30°, the transmittance of the light Ray (a whole range of visible light) becomes constant (almost constant).

The inventors manufactured by way of trial an outer lens in which grooves at the first pitch a of 200 nm were formed and verified an actual manner of appearance of a color for each of the angles θ.

As a result, it was confirmed that in a case where the first pitch a was 200 nm, even when the viewpoint position E (see FIG. 16) relative to the outer lens was changed, the color appearance in which the outer lens appeared to be colored did not occur (hardly occurred).

Meanwhile, referring to FIG. 17A and FIG. 17B, it can be understood that in a case where the first pitch a is 250 nm, when the angles θ are 10°, 20°, and 30°, the transmittance of the light Ray (visible light) on a short wavelength side relatively lowers.

The inventors manufactured by way of trial an outer lens in which grooves at the first pitch a of 250 nm were formed and verified the actual manner of appearance of the color for each of the angles θ.

As a result, it was confirmed that in a case where the first pitch a was 250 nm, when the viewpoint position E (see FIG. 16) relative to the outer lens was changed, the color appearance in which the outer lens appeared to be colored occurred. Further, it was confirmed that this color appearance was correlated with the transmittance (see FIG. 17A to FIG. 17C) of the light Ray. For example, referring to FIG. 17A, in a case where the first pitch a is 250 nm, when the angle θ is 10°, the transmittance of the light Ray (visible light) on the short wavelength side lowers. It was confirmed that in this case, when the viewpoint position E (see FIG. 16) was placed in a direction of the angle θ=10°, light at a wavelength (color) corresponding to the short wavelength side on which the transmittance lowered was seen.

A cause of this is considered to be a situation where light which is not transmitted through the outer lens 10A, in the light Ray (visible light) that is incident on the outer lens 10A in the direction of the angle θ, is reflected or diffracted, the reflected light or diffracted light interferes with each other, and the color appearance in which the outer lens 10A appears to be colored thereby occurs. The above circumstance is considered to similarly apply to cases of the angles θ=20° and 30°.

Further, referring to FIG. 17A and FIG. 17B, it can be understood that in a case where the first pitch a is 350 nm, when the angles θ are 10° and 20°, the transmittance of the light Ray (visible light) on the short wavelength side relatively lowers. Further, it can be understood that in a case where the first pitch a is 350 nm, when the angle θ is 30°, the transmittance of the light Ray (visible light) at intermediate wavelengths between the short wavelength side and a long wavelength side relatively lowers.

The inventors manufactured by way of trial an outer lens in which grooves at the first pitch a of 350 nm were formed and verified the actual manner of appearance of the color for each of the angles θ.

As a result, it was confirmed that in a case where the first pitch a was 350 nm, when the viewpoint position E (see FIG. 16) relative to the outer lens was changed, the color appearance in which the outer lens appeared to be colored occurred. Further, it was confirmed that this color appearance (the manner of appearance of the color of the outer lens) was correlated with the transmittance (see FIG. 17A to FIG. 17C) of the light Ray. For example, referring to FIG. 17A, in a case where the first pitch a is 350 nm, when the angle θ is 10°, the transmittance of the light Ray (visible light) on the short wavelength side lowers. It was confirmed that in this case, when the viewpoint position E (see FIG. 16) was placed in the direction of the angle θ=10°, the light at the wavelength (color) corresponding to the short wavelength side on which the transmittance lowered was seen.

A cause of this is considered to be the situation where the light which is not transmitted through the outer lens 10A, in the light Ray (visible light) that is incident on the outer lens 10A in the direction of the angle θ, is reflected or diffracted, the reflected light or diffracted light interferes with each other, and the color appearance in which the outer lens 10A appears to be colored thereby occurs. The above circumstance is considered to similarly apply to the cases of the angles θ=20° and 30°.

Based on the above, as a condition for inhibiting the color appearance in which the outer lens 10A appears to be colored depending on the viewpoint position E (see FIG. 16), the above expression 8, that is, a≤200 nm is derived. Here, a term a denotes the pitch of the grooves formed in the first region B1 (see FIG. 14B). Taking this into consideration, in the second embodiment, in the first region B1, the grooves are formed at the regular pitch a (see FIG. 14B) which satisfies the above expression 8. Accordingly, the color appearance can be inhibited in which the outer lens 10A (first region B1) appears to be colored depending on the viewpoint position E (see FIG. 16).

Here, it is possible to form, also in the second region B2, the grooves at the regular pitch a (see FIG. 14B) which satisfies the above expression 8.

However, there is a problem that performing this makes the mold release resistance large, a larger force than the mold release resistance is exerted on the molded article when the metal mold 40A is detached from the molded article (outer lens 10A), and the molded article might be deformed. Further, there is also a problem that the metal mold 40A cannot be detached from the molded article in the first place.

The inventors have conducted intensive studies to solve those problems and as a result discovered that the grooves are formed not at the regular pitch but at the irregular pitches b1 and b2 (see FIG. 14C) in the second region B2, the mold release resistance can thereby be made small, and the color appearance can be inhibited in which the outer lens 10A (second region B2) appears to be colored depending on the viewpoint position E (FIG. 16).

Figure 18:
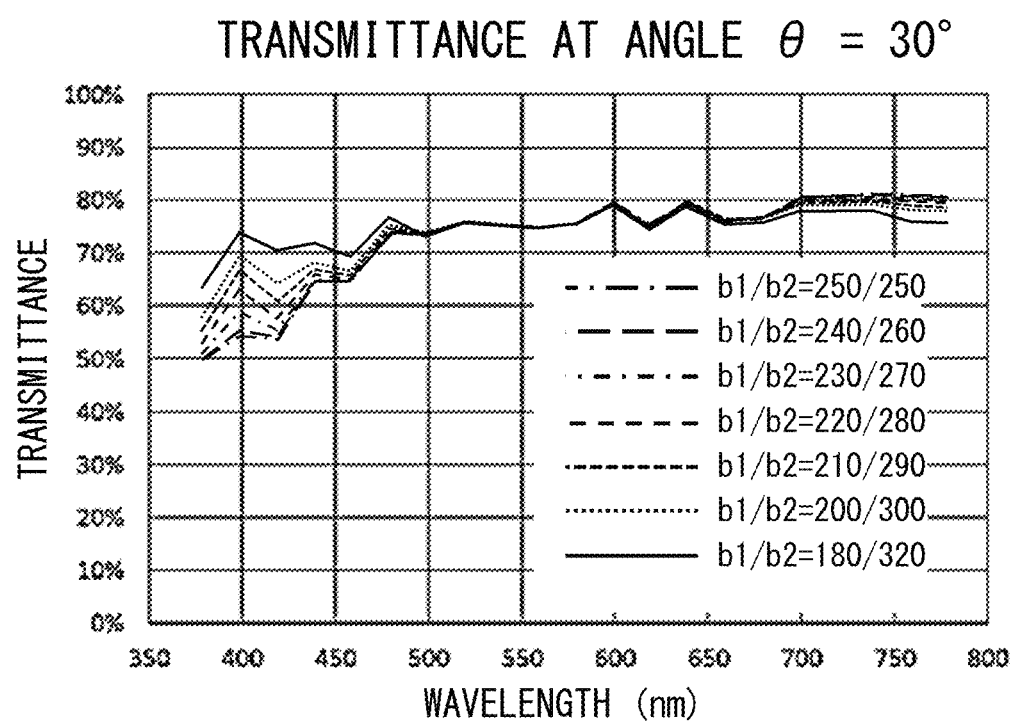
FIG. 18 is a graph representing results of a simulation 2.

In the following, this point will be described by referring to results of a simulation (hereinafter, referred to as a simulation 2) which was performed by the inventors. FIG. 18 is a graph representing the results of the simulation 2.

In the simulation 2, as illustrated in FIG. 16, the transmittance of the light Ray (visible light), which was incident on the outer lens 10A at the angle θ (=30° and was transmitted through the outer lens 10A, was simulated.

Specifically, the simulation 2 was performed for six kinds of outer lenses 10A in which the grooves were formed at the irregular pitches b1 and b2 (=b1/b2=240/260, b1/b2=230/270, b1/b2=220/280, b1/b2=210/290, b1/b2=200/300, and b1/b2=180/320) and the average pitch was 250 nm. Further, for comparison, the simulation 2 was also performed for the outer lens 10A in which the grooves were formed at a regular pitch (b1/b2=250/250). Note that the groove depth, the groove width, the aspect ratio, the groove angle, and the protrusion portion widths are common to those as groove depth D=200 nm, groove width W2=100 nm, aspect ratio D/W2=2.0, groove angle θ1=90°, protrusion portion width W1a=(b1−W2) nm, protrusion portion width W1b=(b2−W2) nm, and protrusion portion width W1=(W1a+W1b)/2. Note that in FIG. 18, b1/b2=240/260 represents b1=240 nm and b2=260 nm. The same applies to the other items.

Referring to FIG. 18, it can be understood that as a difference between b1 and b2 becomes larger, a drop of the transmittance of the light Ray (visible light) on the short wavelength side is decreased (the color appearance is decreased).

FIG. 19 is a table which summarizes the groove pitches indicated in FIG. 18 and average transmittances.

In FIG. 19, b(max) represents the maximum pitch, b(min) represents the minimum pitch, b(ave) represents the average pitch, (1) 380-480 nm represents the average transmittances in this wavelength range, (2) 500-780 nm represents the average transmittances in this wavelength range, and (1)/(2) represents the value resulting from the division of the average transmittance (380-480 nm) by the average transmittance (500-780 nm). It can be considered that as (1)/(2) becomes larger, a state is established where the color appearance at short wavelengths can be reduced.

Referring to FIG. 19, compared to (1)/(2) of No. 1 which is 77.2%, (1)/(2) of No. 2 is 77.5%, and a significant difference of color appearance reduction is not observed between No. 1 and No. 2.

On the other hand, (1)/(2) of each of No. 3 to No. 7 is 79.1% or higher, and a significant difference is observed. In particular, it can be understood that in cases of No. 6 and No. 7, (1)/(2) are 87% or higher, and the color appearance at short wavelengths is clearly alleviated.

Based on the above, as a condition for inhibiting the color appearance in which the outer lens 10A (second region B2) appears to be colored depending on the viewpoint position E (see FIG. 16), the above expression 9, that is, {b(max)}−b(min)/b(ave)≥0.16 is derived. As for a value of 0.16 in the expression 9, a numerical value of 0.16 of b(max)−b(min)/b(ave) of No. 3 in FIG. 19 is employed. Taking this into consideration, in the second embodiment, in the second region B2, the grooves are formed at the irregular pitches b1 and b2 (see FIG. 14C) which satisfy the above expression 9. Accordingly, the color appearance can be inhibited in which the outer lens 10A (second region B2) appears to be colored depending on the viewpoint position E (see FIG. 16).

Figure 20:
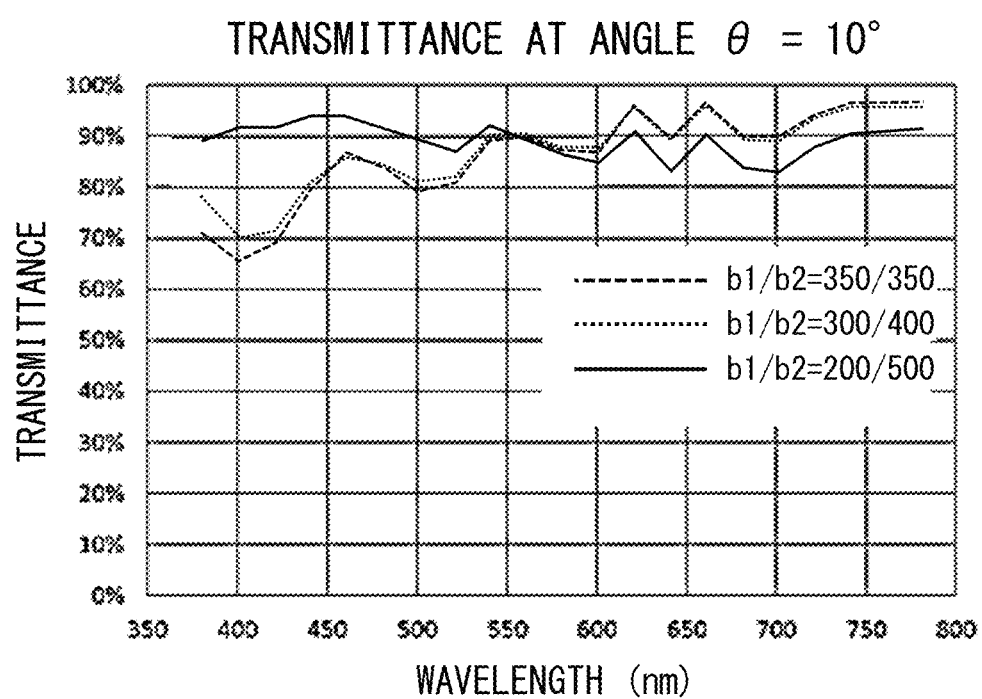
FIG. 20 is a graph representing results of a simulation 3.

Next, a description will be made by referring to results of a simulation (hereinafter, referred to as a simulation 3) which was performed by the inventors for verifying the above expression 9. FIG. 20 is a graph representing the results of the simulation 3.

In the simulation 3, as illustrated in FIG. 16, the transmittance of the light Ray (visible light), which was incident on the outer lens 10A at the angle θ (=10° and was transmitted through the outer lens 10A, was simulated.

Specifically, the simulation 3 was performed for two kinds of outer lenses 10A in which the grooves were formed at the irregular pitches b1 and b2 (=b1/b2=300/400 and b1/b2=200/500) and the average pitch was 350 nm. Further, for comparison, the simulation 3 was also performed for the outer lens 10A in which the grooves were formed at a regular pitch (b1/b2=350/350). Note that the groove depth, the groove width, the aspect ratio, the groove angle, and the protrusion portion widths are common to those as groove depth D=200 nm, groove width W2=100 nm, aspect ratio D/W2=2.0, groove angle θ1=90°, protrusion portion width W1a=(b1−W2) nm, protrusion portion width W1b=(b2−W2) nm, and protrusion portion width W1=(W1a+W1b)/2. Note that in FIG. 20, b1/b2=300/400 represents b1=300 nm and b2=400 nm. The same applies to the other item.

Referring to FIG. 20, it can be understood that as the difference between b1 and b2 becomes larger, drops of the transmittance of the light Ray (visible light) on the short wavelength side are decreased (the color appearance is decreased).

FIG. 21 is a table which summarizes the groove pitches indicated in FIG. 20 and average transmittances.

In FIG. 21, b(max) represents the maximum pitch, b(min) represents the minimum pitch, b(ave) represents the average pitch, (1) 380-540 nm represents the average transmittances in this wavelength range, (2) 560-780 nm represents the average transmittances in this wavelength range, and (1)/(2) represents the value resulting from the division of the average transmittance (380-540 nm) by the average transmittance (560-780 nm). It can be considered that as (1)/(2) becomes larger, a state is established where the color appearance at short wavelengths can be reduced.

Referring to FIG. 21, it can be understood that (1)/(2) of No. 2 is 86.0%, (1)/(2) of No. 3 is 104.0%, and the color appearance at short wavelengths is clearly alleviated.

Based on the above, it can be understood that also in a case where the average pitch is 350 nm, as a condition for inhibiting the color appearance in which the outer lens 10A (second region B2) appears to be colored depending on the viewpoint position E (see FIG. 16), the above expression 9, that is, {b(max)−b(min)}/b(ave)≥0.16 is effective.

As described above, in a case where the grooves are formed at the regular pitch a (see FIG. 14B), which satisfies the above expression 8, in the first region B1 and the grooves are formed at the irregular pitches b1 and b2 (see FIG. 14C), which satisfy the above expression 9, in the second region B2, by satisfying the above expression 7, that is, a<(b1+b2)/2, the mold release resistance can be made small compared to a case of a=(b1+b2)/2. Note that it has been found that as illustrated in FIG. 22, the mold release resistance lowers in inverse proportion to the average pitch ((b1+b2)/2). FIG. 22 is a table which summarizes a relationship between the surface roughness Ra of the metal mold and an assumed mold release resistance ratio in a case where the grooves formed in the outer lens 10A have the irregular pitches b1 (=100 nm) and b2 (=100 nm, 150 nm, 200 nm, and 250 nm), groove depth D=200 nm, groove width W2=100 nm, aspect ratio D/W2=2.0, and groove angle θ1=90°. Note that here, b1 is 100 nm, for example, and b2 is 100 nm, 150 nm, 200 nm, or 250 nm, for example, but this is not restrictive. That is, b1 and b2 may be arbitrary values with which (b1+b2)/2 satisfies the values indicated in FIG. 22.

In FIG. 22, the assumed mold release resistance ratio is the value which is obtained by obtaining the mold release resistance for each average pitch ((b1+b2)/2) and by dividing each mold release resistance by the mold release resistance in a case where the average pitch ((b1+b2)/2) is 200 nm. This represents that as the assumed mold release resistance ratio becomes smaller, the mold release resistance becomes smaller (the metal mold is more likely to be detached from the molded article).

Next, a description will be made about results of the anti-fogging effect confirmation test which was performed by the inventors for confirming the anti-fogging properties.

FIG. 23 is a table which summarizes the results (anti-fogging properties) obtained by performing the anti-fogging effect confirmation test for samples S7 to S10 with different groove pitches. The anti-fogging effect confirmation test is the same as the anti-fogging effect confirmation test (steam test) described in the above first embodiment. Data and so forth of the samples S7 to S10 are as follows. Here, a groove pitch a of the samples S7 to S10 corresponds to the groove pitch P of the samples S1 to S6.

Sample S7

The sample S7 is a flat plate (60 mm square and a thickness of 2 mm) formed of an acrylic resin and has groove pitch (regular pitch) a=225 nm, groove depth D=300 nm, groove width L (W2)=150 nm, width S (W1) of linear protrusion portion=75 nm, aspect ratio D/L (W2)=2, and groove angle θ1=90°.

Sample S8

The sample S8 is a flat plate (60 mm square and a thickness of 2 mm) formed of an acrylic resin and has groove pitch (regular pitch) a=300 nm, groove depth D=300 nm, groove width L (W2)=150 nm, width S (W1) of linear protrusion portion=150 nm, aspect ratio D/L (W2)=2, and groove angle θ1=90°.

Sample S9

The sample S9 is a flat plate (60 mm square and a thickness of 2 mm) formed of an acrylic resin and has groove pitch (regular pitch) a=450 nm, groove depth D=300 nm, groove width L (W2)=150 nm, width S (W1) of linear protrusion portion=300 nm, aspect ratio D/L (W2)=2, and groove angle θ1=90°.

Sample S10

The sample S10 is a flat plate (60 mm square and a thickness of 2 mm) formed of an acrylic resin and has groove pitch (regular pitch) a=600 nm, groove depth D=300 nm, groove width L (W2)=150 nm, width S (W1) of linear protrusion portion=450 nm, aspect ratio D/L (W2)=2, and groove angle θ1=90°.

As a result of the test using the above samples S7 to S10, it was confirmed that even the groove pitch was widened, the anti-fogging properties (expected anti-fogging effect) were realized. "ANTI-FOGGING PROPERTIES GOOD" indicated in FIG. 23 represents that the anti-fogging properties (expected anti-fogging effect) are realized. This is considered to be because the water droplet was stretched in the groove direction and the groove intersecting direction by the capillary force of the grooves (groove structure), the surface area of the water droplet was expanded, and evaporation of the water droplet was consequently promoted. By employing the above expression 2 and expressions 4 to 6, the expected anti-fogging effect was also obtained.

Whether or not the capillary force is realized depends on an individual groove shape. Thus, when the groove shape (see the above first embodiment) in which the capillary force is realized is used, the anti-fogging properties are realized even when the groove pitch is changed in several 100 nm order.

A reason for that is considered to be because the water droplet size is in approximately several 10 µm order, even when the groove pitch is changed in several 100 nm order, some grooves are present under the water droplet, and the capillary force is thus realized.

Because the number of grooves under the water droplet increases as the groove pitch becomes narrower, the capillary force becomes larger proportionally to the number of grooves. As a result, as the groove pitch becomes narrower, the water droplet becomes laterally longer. For example, as illustrated in FIG. 23, the water droplets in the sample S7 (photograph) are laterally long compared to the water droplets in the sample S10 (photograph). "STEAM TEST RESULT (PHOTOGRAPH)" in FIG. 23 indicates photographs in which the samples S7 to S10 are photographed. In FIG. 23, a region higher than a straight line L represents the processed surface in which the groove structure is formed, and a region lower than the straight line L represents the base surface (flat surface) in which no groove structure is formed. Further, in FIG. 23, circles (plural) and ellipses (plural) which appear to be white represent the water droplets, and a direction in which the straight line L extends represents a direction in which the grooves extend.

On the other hand, because corner portions to serve as starting points of water droplet adhesion increase as the groove pitch becomes narrower, a water droplet adhesion density tends to increase. For example, as illustrated in FIG. 23, the water droplet adhesion density in the sample S7 (photograph) is a higher density than the water droplet adhesion density in the sample S10 (photograph).

Note that FIG. 23 illustrates examples of cases of the regular pitches, but regardless of whether the groove pitch is the regular pitch or the irregular pitches, eventually, whether or not the anti-fogging properties are realized is considered to depend on how many grooves having shapes in which the capillary force is realized (see the above first embodiment) are present under the water droplets. It is considered that even in a case of the irregular pitches, the anti-fogging properties are realized as long as the grooves having the shapes in which the capillary force is realized are present under the water droplets.

Conversely, when the shapes of the grooves themselves are changed (particularly, the aspect ratio is lowered) in order to reduce the mold release resistance, the anti-fogging properties are not realized. For example, as illustrated in FIG. 5, in a case where the aspect ratio is 1.0 or 1.3, the anti-fogging properties are not realized (no anti-fogging effect). On the other hand, in a case where the aspect ratio is 2.0, the anti-fogging properties are realized (anti-fogging effect present).

As described above, in the second embodiment, the color appearance can be inhibited in which an outer lens 30 appears to be colored depending on the viewpoint position E (see FIG. 16).

This is because the grooves are formed at pitches at which the transmittance of visible light in a predetermined angle (for example, angle θ=10° to 30° and see FIG. 16) range becomes generally constant, the visible light being incident on the regions (first region B1 and second region B2), in which the grooves are formed, in a surface of the outer lens 30, the visible light being transmitted through the outer lens 30 (see FIG. 17 to FIG. 19).

Further, in the second embodiment, the color appearance can be inhibited in which the light-transmitting resin member (first region B1) appears to be colored depending on the viewpoint position E (see FIG. 16). This is because the expression 8 is employed.

Further, in the second embodiment, the color appearance can be inhibited in which the light-transmitting resin member (second region B2) appears to be colored depending on the viewpoint position E (see FIG. 16). This is because the expression 9 is employed.

Further, in the second embodiment, the mold release resistance in detaching the metal mold from the molded article (the outer lens 10A as the light-transmitting resin member) (in mold releasing) can be made small.

This is because the expression 7 is employed, that is, the average pitch of the grooves formed in the second region B2 is made wider than the first pitch of the grooves formed in the first region B1.

Further, as a result of the fact that the mold release resistance in detaching the metal mold from the molded article (light-transmitting resin member) (in the mold releasing) can be made small, the probability can be lowered that a crack, deformation, or the like occurs to the molded article (light-transmitting resin member) in the mold releasing. Accordingly, a yield of the molded article (light-transmitting resin member) can be improved.

Further, in the second embodiment, the expected anti-fogging effect can be exhibited while the transmittance of light is inhibited from being diminished due to the groove structure.

The transmittance of light can be inhibited from being diminished due to the groove structure because the above expression 3 is employed.

The expected anti-fogging effect can be exhibited because the above expression 1, expression 2, and expression 4 to expression 6 are employed.

Next, a modification will be described.

Figure 24A:
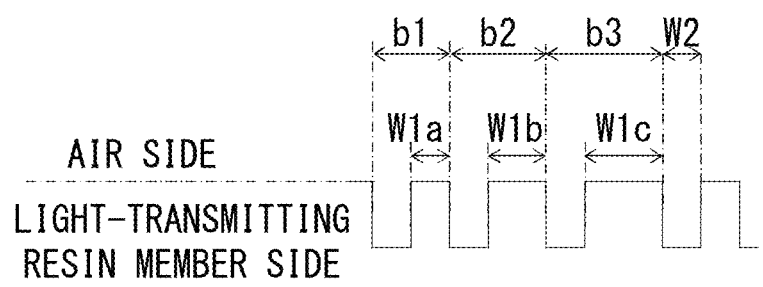
FIG. 24A illustrates one example where the grooves are formed at irregular pitches (three or more kinds of groove pitches)

In the above second embodiment, a description is made about an example where the grooves are formed at the irregular pitches (two kinds of groove pitches) (see FIG. 14C), but this is not restrictive. For example, as illustrated in FIG. 24A, the grooves may be formed at irregular pitches (three or more kinds of groove pitches). FIG. 24A illustrates one example where the grooves are formed at the irregular pitches (three or more kinds of groove pitches).

Figure 24B:
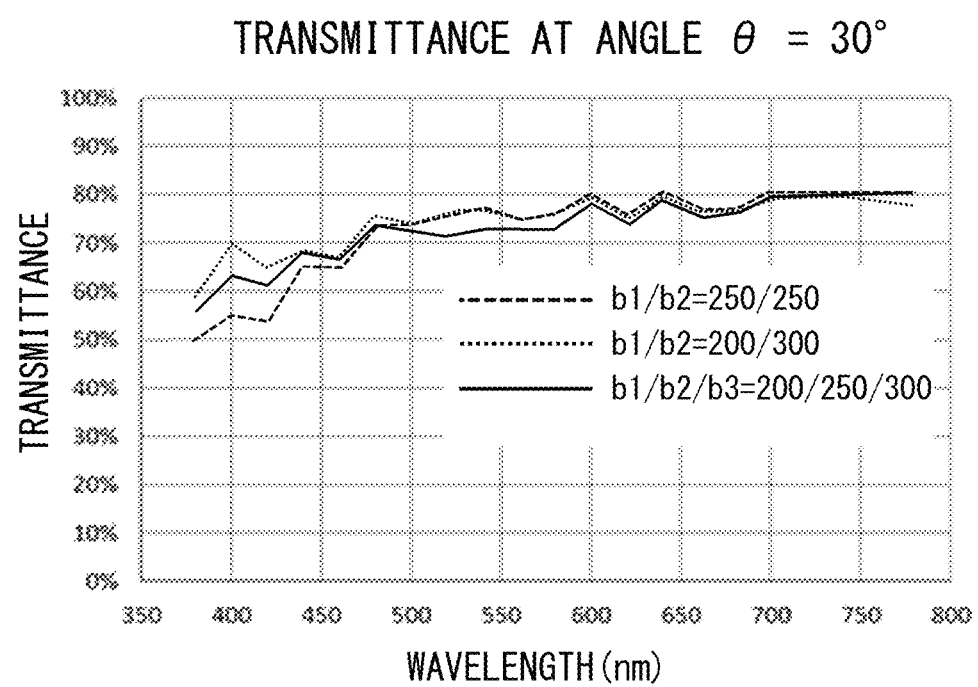
FIG. 24B is a graph representing results of a simulation 4.

A description will be made by referring to results of a simulation (hereinafter, referred to as a simulation 4) which was performed by the inventors for verifying the irregular pitches (three or more kinds of groove pitches). FIG. 24B is a graph representing the results of the simulation 4.

In the simulation 4, as illustrated in FIG. 16, the transmittance of the light Ray (visible light), which was incident on the outer lens 10A at the angle θ(=30° and was transmitted through the outer lens 10A, was simulated.

Specifically, the simulation 4 was performed for two kinds of outer lenses 10A in which the grooves were formed at the irregular pitches (=b1/b2=200/300 and b1/b2/b3=200/250/300). Further, for comparison, the simulation 4 was also performed for the outer lens 10A in which the grooves were formed at a regular pitch (b1/b2=250/250). Note that the groove depth, the groove width, the aspect ratio, the groove angle, and the protrusion portion widths are common to those as groove depth D=200 nm, groove width W2=100 nm, aspect ratio D/W2=2.0, groove angle θ1=90°, protrusion portion width W1a=(b1−W2) nm, protrusion portion width W1b=(b2−W2), and protrusion portion width W2c=(b3−W3) nm. Note that in a case of b1/b2=200/300, protrusion portion width W1=(W1a+W1b)/2 is satisfied. Meanwhile, in a case of b1/b2/b3=200/250/300, protrusion portion width W1=(W1a+W1b+W1c)/3 is satisfied. Note that in FIG. 24B, b1/b2/b3=200/250/300 represents b1=200 nm, b2=250 nm, and b3=300. The same applies to the other items. Referring to FIG. 24B, it can be understood that in a case where the grooves are formed at the irregular pitches (three kinds of groove pitches of b1/b2/b3=200/250/300), compared to a case where the grooves are formed at the regular pitch (b1/b2=250), drops of the transmittance on the short wavelength side are decreased (the color appearance is decreased).

Further, in the above second embodiment, a description is made about an example where the grooves are formed in the first region B1, but this is not restrictive. For example, a part or all of the grooves of the first region B1 may be omitted. This is because the region which contributes to the optical characteristics (first region B1) has a high temperature by heat from the lighting tool unit 30 (mainly the light source) and is thereby less likely to be fogged.

In such a manner, the mold release resistance in detaching the metal mold from the molded article (the outer lens 10A as the light-transmitting resin member) (in the mold releasing) can also be made small.

Further, in the second embodiment, a description is made about an example where the groove pitch of the grooves formed in the first region B1 is the regular pitch a (see FIG. 14B), but the groove pitches of the grooves formed in the second region B2 are the irregular pitches b1 and b2 (see FIG. 14C), and as the condition for making the mold release resistance small, the expression 7, that is, a<(b1+b2)/2 is used; however, this is not restrictive.

For example, the groove pitch of the grooves formed in the first region B1 may be the regular pitch a (see FIG. 14B), further the groove pitch of the grooves formed in the second region B2 may be a regular pitch b (not illustrated), and as the condition for making the mold release resistance small, instead of the expression 7, a<b may be used.

In the above manner, the mold release resistance in detaching the metal mold from the molded article (the outer lens 10A as the light-transmitting resin member) (in the mold releasing) can also be made small.

All numerical values indicated in the above embodiments are examples, and it goes without saying that appropriate numerical values different from those can be used.

The above embodiments are only examples in all respects. The present invention is not restrictively interpreted based on the descriptions about the above embodiments. The present invention can be carried out in various other forms without departing from the spirit and scope or the main features.

The present application claims priority based on Japanese Patent Application No. 2021-203596, filed on Dec. 15, 2021, the entirety of which is incorporated herein by reference.

REFERENCE SIGNS LIST

10 Light-Transmitting Resin Member
S (S1 to S6) Sample
11 Linear Protrusion Portion
12 Linear Recess Portion
20 Saline Solution
21 Stainless Steel Bottle
22 Hot Water Bath
23 Hot Water
24 Vapor
25 Lower Surface
26 Microscope Camera with Objective Lens

The invention claimed is:

1. A light-transmitting resin member, in at least a part of a surface of which a plurality of groove structures configured with a plurality of linear protrusion portions and a plurality of linear recess portions are formed, wherein
   the linear protrusion portions and the linear recess portions extend in directions parallel with each other, and
   the grooves are formed at a pitch at which transmittance of visible light incident at an incident angle in a predetermined range becomes approximately constant, the visible light being incident on a region, in which the grooves are formed, in the surface, the visible light being transmitted through the light-transmitting resin member, wherein
   the linear protrusion portions and the linear recess portions extend in directions parallel with each other,
   an average value W1 of widths of the linear protrusion portions satisfies 75 nm≤W1≤200 nm,
   an average value W2 of widths of the linear recess portions, the average value W2 being a width of the grooves, satisfies 75 nm≤W2≤450 nm,
   a pitch P between the grooves neighboring each other satisfies 150 nm≤P≤600 nm,
   an aspect ratio D/W2 of a depth D of the grooves to the width W2 of the grooves satisfies 2.0≤D/W2,
   an angle θ1 of a side wall of the grooves relative to a reference plane satisfies 60°≤θ1≤90°, and
   a contact angle θ2 of water relative to the surface in which the grooves are not formed satisfies 60°≤θ2≤90°.

2. The light-transmitting resin member according to claim 1, wherein the pitch is an irregular pitch.

3. The light-transmitting resin member according to claim 2, wherein a material of the light-transmitting resin member is an acrylic resin or a polycarbonate.

4. The light-transmitting resin member according to claim 2, wherein
   the light-transmitting resin member is a light-transmitting resin member through which light radiated from a light source of a vehicle lighting tool is transmitted, and
   the linear protrusion portions and the linear recess portions are formed in a back surface of the light-transmitting resin member.

5. The light-transmitting resin member according to claim 1, wherein the pitch is a regular pitch.

6. The light-transmitting resin member according to claim 5, wherein in a case where the regular pitch is set as a, a≤200 nm is satisfied.

7. The light-transmitting resin member according to claim 5, wherein a material of the light-transmitting resin member is an acrylic resin or a polycarbonate.

8. The light-transmitting resin member according to claim 5, wherein
   the light-transmitting resin member is a light-transmitting resin member through which light radiated from a light source of a vehicle lighting tool is transmitted, and
   the linear protrusion portions and the linear recess portions are formed in a back surface of the light-transmitting resin member.

9. The light-transmitting resin member according to claim 1, wherein a width W1 of the linear protrusion portions and a width W2 of the linear recess portions are almost the same.

10. The light-transmitting resin member according to claim 9, wherein
   the light-transmitting resin member is a light-transmitting resin member through which light radiated from a light source of a vehicle lighting tool is transmitted, and
   the linear protrusion portions and the linear recess portions are formed in a back surface of the light-transmitting resin member.

11. The light-transmitting resin member according to claim 10, wherein a material of the light-transmitting resin member is an acrylic resin or a polycarbonate.

12. The light-transmitting resin member according to claim 1, wherein
the light-transmitting resin member is a light-transmitting resin member through which light radiated from a light source of a vehicle lighting tool is transmitted, and
the linear protrusion portions and the linear recess portions are formed in a back surface of the light-transmitting resin member.

13. The light-transmitting resin member according to claim 1, wherein a material of the light-transmitting resin member is an acrylic resin or a polycarbonate.

14. A light-transmitting resin member, in at least a part of a surface of which a plurality of groove structures configured with a plurality of linear protrusion portions and a plurality of linear recess portions are formed, wherein
the linear protrusion portions and the linear recess portions extend in directions parallel with each other, and
the grooves are formed at a pitch at which transmittance of visible light incident at an incident angle in a predetermined range becomes approximately constant, the visible light being incident on a region, in which the grooves are formed, in the surface, the visible light being transmitted through the light-transmitting resin member,
wherein the pitch is an irregular pitch,
wherein in a case where a maximum pitch of the grooves is set as $b(max)$, a minimum pitch of the grooves is set as $b(min)$, and an average pitch of the grooves is set as $b(ave)$,
$\{b(max)-b(min)\}/b(ave) \geq 0.16$ is satisfied.

15. The light-transmitting resin member according to claim 14, wherein a material of the light-transmitting resin member is an acrylic resin or a polycarbonate.

* * * * *